US006429875B1

(12) United States Patent
Pettigrew et al.

(10) Patent No.: US 6,429,875 B1
(45) Date of Patent: Aug. 6, 2002

(54) PROCESSING IMAGE DATA

(75) Inventors: Daniel Pettigrew; Patrick Arbez, both of Montreal (CA)

(73) Assignee: Autodesk Canada Inc., Quebec (CA)

( * ) Notice: Subject to any disclaimer, the term of this patent is extended or adjusted under 35 U.S.C. 154(b) by 0 days.

(21) Appl. No.: 09/283,917

(22) Filed: Apr. 1, 1999

(30) Foreign Application Priority Data

Apr. 2, 1998 (GB) .............................................. 9807097

(51) Int. Cl.[7] .................................................. G09G 5/02
(52) U.S. Cl. ........................ 345/591; 345/581; 345/593; 345/597; 358/500; 382/162; 382/199; 382/205; 382/266
(58) Field of Search ................................. 345/431, 429, 345/591, 589, 581, 150, 133, 593, 597, 600; 358/504, 500; 382/199, 162, 205, 266

(56) References Cited

U.S. PATENT DOCUMENTS 5,475,507 A * 12/1995 Suzuki et al. ............... 345/591
5,568,596 A * 10/1996 Cawley ....................... 345/589
5,598,182 A    1/1997 Berend et al.
5,754,183 A *  5/1998 Berend et al. .............. 345/581
6,043,909 A *  3/2000 Holub ........................ 358/504

FOREIGN PATENT DOCUMENTS

EP          0593028 A1    4/1994
WO         WO 98/11510    3/1998

* cited by examiner

Primary Examiner—Mark Zimmerman
Assistant Examiner—Kimbinh T. Nguyen
(74) Attorney, Agent, or Firm—Gates & Cooper LLP

(57) ABSTRACT

Image frames are stored as a plurality of pixel values. An image frame is viewed in which a perceived object (301) is to be distinguished from the remainder of the image frame. Input signals identify control positions in proximity to the boundary of said object. Pixel values are compared around each of the control positions to define a local color transition. Color transitions for the whole object are then produced by a process of interpolation. In this way, a process similar to chroma-keying may be performed without the need to record a foreground object against a specific type of background object. The chroma-keying process is performed locally with respect to a local color transition. This results in local control signals being produced and control signals for the whole object are then produced by a process of interpolation.

40 Claims, 31 Drawing Sheets $$R_c = \frac{R_{min} + R_{max}}{2}$$

$$G_c = \frac{G_{min} + G_{max}}{2}$$

$$B_c = \frac{B_{min} + B_{max}}{2}$$

$$R_s = \frac{R_{max} - R_{min}}{2}$$

$$G_s = \frac{G_{max} - G_{min}}{2}$$

$$B_s = \frac{B_{max} - B_{min}}{2}$$

$$C_{r,r} = \frac{\sum_{0 \leq i < N} r^2 i}{N} - \mu_r^2$$

$$C_{g,g} = \frac{\sum_{0 \leq i < N} gi^2}{N} - \mu_g^2$$

$$C_{b,b} = \frac{\sum_{0 \leq i < N} bi^2}{N} - \mu_b^2$$

$$C_{r,g} = C_{g,r} = \frac{\sum_{0 \leq i < N} C_r C_g}{N} - \mu_r \mu_g$$

$$C_{r,b} = C_{b,r} = \frac{\sum_{0 \leq i < N} C_r C_b}{N} - \mu_r \mu_b$$

$$C_{g,b} = C_{b,g} = \frac{\sum_{0 \leq i < N} C_r C_b}{N} - \mu_r \mu_b$$

$$\text{where } \mu_r = \frac{\sum_{0 \leq i < N} r_i}{N}, \quad \mu_g = \frac{\sum_{0 \leq i < N} g_i}{N}$$

$$\mu_b = \frac{\sum_{0 \leq i < N} b_i}{N}$$

*Figure 16*

$$MC = \begin{pmatrix} c_{r,r} & c_{r,g} & c_{r,b} \\ c_{g,r} & c_{g,g} & c_{g,b} \\ c_{b,r} & c_{b,g} & c_{b,b} \end{pmatrix}$$

from which eigervectors u v & w
are calculated to give a tansformation
matrix such that:

$$\begin{pmatrix} u_1 & u_2 & u_3 \\ v_1 & v_2 & v_3 \\ w_1 & w_2 & w_3 \end{pmatrix} \begin{pmatrix} r_i \\ g_i \\ b_i \end{pmatrix}$$

achieves the desired rotation in colour space.

*Figure 17*

$$M = \frac{\begin{pmatrix}R\\G\\B\end{pmatrix}.mFW(P1).W1 + \begin{pmatrix}R\\G\\B\end{pmatrix}.mFW(P2).W2 + \begin{pmatrix}R\\G\\B\end{pmatrix}.mFW(P3).W3 + \begin{pmatrix}R\\G\\B\end{pmatrix}.mFW(P4).W4}{W1 + W2 + W3 + W4}$$

*Figure 31*

PROCESSING IMAGE DATA

FIELD OF THE INVENTION

The present invention relates to processing image data in which an image frame is divided into a plurality of pixel values.

INTRODUCTION TO THE INVENTION

Many procedures for modifying image data after the data has been recorded are known and collectively these procedures are often referred to as Post Production Compositing is a post production technique in which portions of a first image are combined artificially with portions of other images to produce a composite image.

When compositing of this type is to take place, the compositing procedures may be assisted by adopting appropriate techniques during the production process, such as recording foreground images against blue screen or green screen backgrounds etc. Under these circumstances, foreground images may be removed from a background screen using a process of chroma-keying.

A system in which each pixel is represented by three colour components defining a position within colour-space is disclosed in International patent publication WO 98/11510. A base colour is identified and a distance in colour-space between an input colour and said base colour is calculated. The control value, which may be used as a basis for a chroma suppress or a chroma-key etc, is produced in response to the calculated distance.

Chroma-keying techniques are being improved so as to extend the type of images where this technique may be used and also to increase the speed at which the chroma-keying process takes place. However, there are some situations where it is desirable to separate a first portion of an image from a second portion of an image, or at least to identify a boundary between the images, from source material where chroma-keying techniques would be ineffective. In particular, chroma-keying is not possible when the same or very similar colours are present in both the first portion of the image and the second portion of the image.

SUMMARY OF THE INVENTION

According to a first aspect of the present invention, there is provided a method of processing image data in which an image frame is divided by a plurality of pixel values, comprising steps of viewing an image frame in which a perceived object is to be distinguished from the remainder of the image frame; manually identifying positions in proximity to the boundary of said object; comparing pixel values around each identified position to define local colour transitions; and interpolating between said transitions to produce a boundary for the object.

Preferably, at each control point, a first region is identified at a position on a first side of the boundary; a second region is selected at a position on the second side of the boundary; and the colours of said selected regions are compared to identify an accurate boundary position. Preferably, the position of the first region and the position of the second region are identified by shapes connected together by a line crossing the boundary. Preferably, the length of said line is adjustable.

According to a second aspect of the present invention, there is provided image processing apparatus, comprising storage means for storing image frames as a plurality of pixel values; viewing means for viewing an image frame in which a perceived object is to be distinguished from the remainder of the image frame; input means configured to receive input signals identifying control positions in proximity to the boundary of said object; comparing means configured to compare pixel values around each identified control position to define a local colour transition; and interpolating means configured to interpolate between said colour transitions to produce a boundary for said object.

BRIEF DESCRIPTION OF THE DRAWINGS

FIG. 15 illustrates the calculation of a central vertex for the bounding box shown in FIG. 14B;

FIGS. 16 and 17 illustrate the calculation of igon vectors;

FIG. 31 details the division step identified in FIG. 30; and

DETAILED DESCRIPTION OF THE PREFERRED EMBODIMENTS

Figure 1:
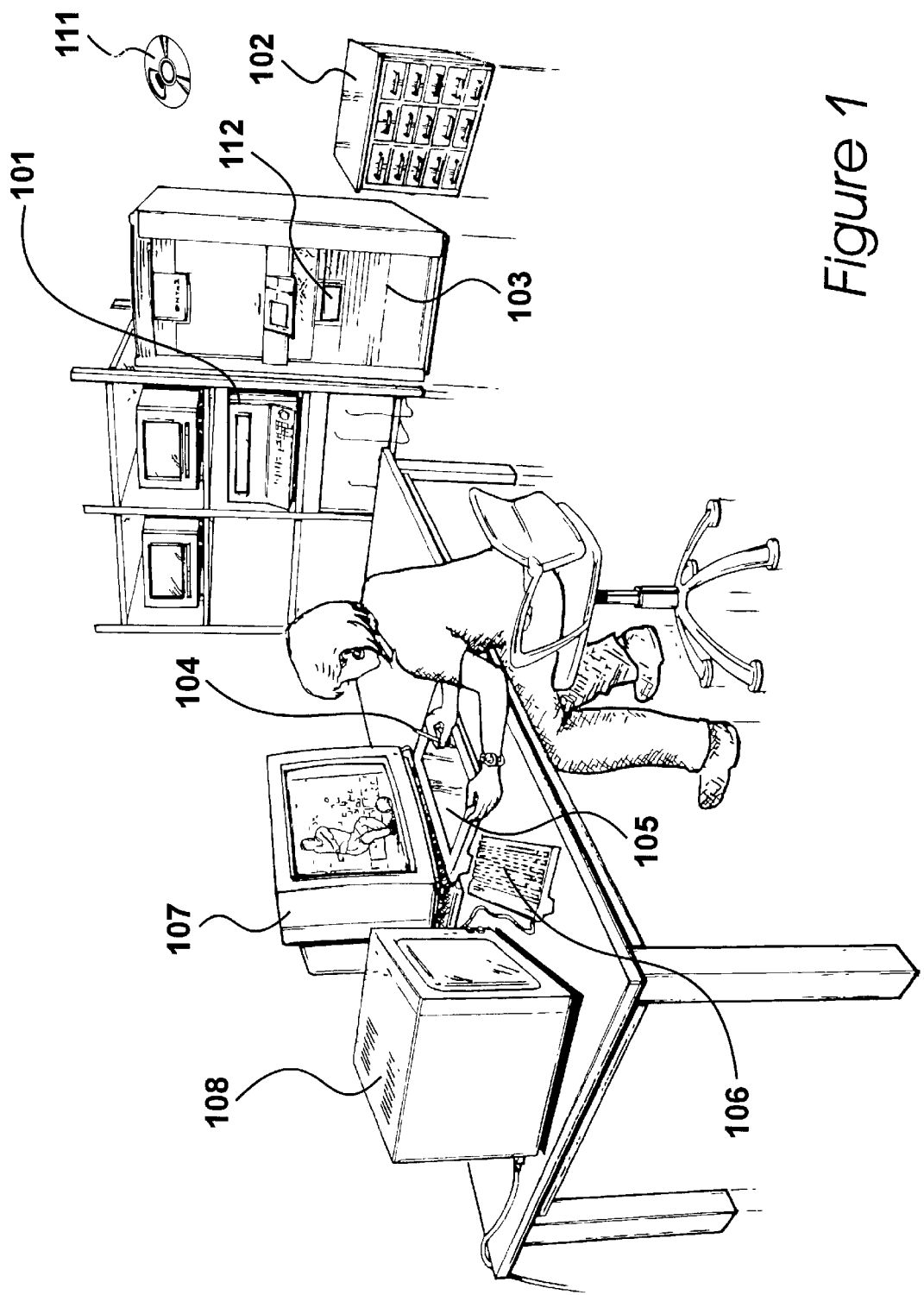
FIG. 1 shows a post production station, having a processing system, in-put devices and visual display devices.

A post production station is shown in FIG. 1 in which source material is played from a video tape recorder 101 for storage in randomly accessible form by means of a plurality of discs 102. Data is written to the disc store 102 and read from said store under the control of a processing system 103, based around an Onyx II computer manufactured by Silicon Graphics Inc.

An operator controls operations of the processing system 103 by means of a stylus 104 applied to a touch tablet 105 in combination with a keyboard 106. Images and control menus are supplied to a high definition visual display unit 107 and video images may also be supplied to broadcast quality monitor 108.

Operating instructions executable by the processing system 103 are received by means of a computer-readable medium such as a CD ROM 111 receivable within a CD ROM player 112.

Figure 2:
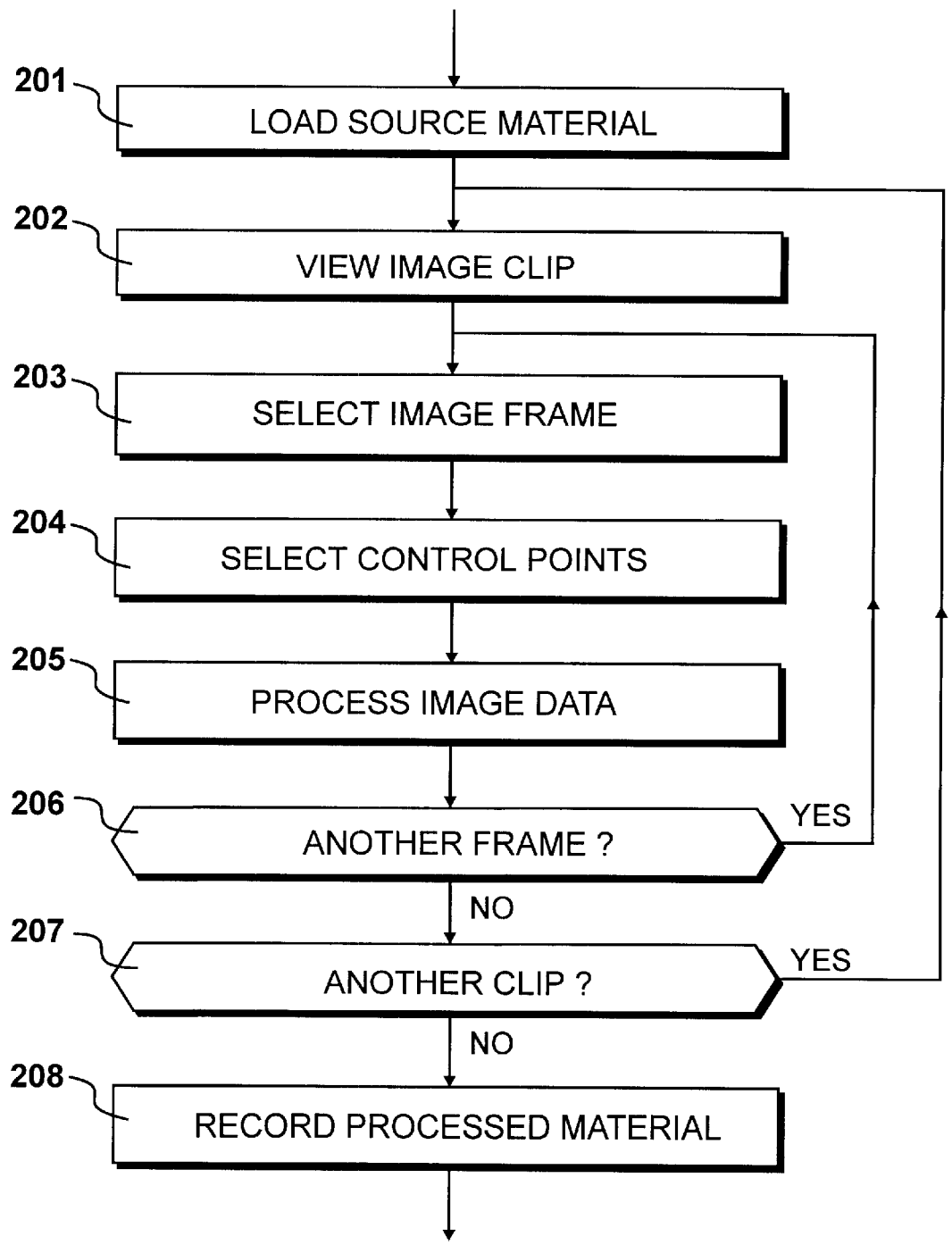
FIG. 2 illustrates procedures performed by the post production station shown in FIG. 1.

Operations performed by the post production station shown in FIG. 1 are illustrated in FIG. 2. At step 201 source material is loaded into the system, by loading a video tape into video tape recorder 101, such as a D1 type video tape recorder manufactured by Sony Inc. After the source material has been written to the disc storage device 102, the operator may access the material and view image clips, as identified at step 202.

At step 203 an image frame is selected by manual operation of the stylus 104 and further operation of said stylus allows control points to be selected within a particular image frame.

A module may be called which is directed towards allowing a portion of an image to be distinguished from other portions of the image. Thus, an accurately positioned line may be defined which effectively places an outline around an object within an image so as to distinguish said object from the remaining background. Once defined in this way, the line may have many applications and could, for example, be used to generate a key signal. This approach is particularly attractive when generating a key signal for an image which has not been recorded using blue screen techniques, for example, and is not appropriate for a key signal to be generated by a process of chroma-keying or by similar techniques.

After the image data has been processed at step 205, a question is asked at step 206 as to whether another frame is to be processed and if this question is answered in the affirmative, the procedure returns to step 203.

After all of the frames in a particular clip have been processed, a question is asked at step 207 as to whether another clip is to be processed an if this question is answered in the affirmative the procedure is returned to step 202. Eventually, all of the clips will have been processed and the question asked at step 207 will be answered in the negative, allowing the processed material to be recorded back onto tape by means of tape recorder 101 at step 208.

The present embodiment provides for the processing of image data in which an image frame is defined by a plurality of pixel values. The image frame includes a perceived object and it is the purpose of the module to distinguish this object from the remainder of the image frame; particularly in situations where it is difficult to define a specific property (such as colour or luminance) which is totally present within the required object and totally absent in the surrounding area.

Control points are manually identified at positions close to the boundary of the perceived object. Pixel values around each identified control point are compared to define local colour transition points. An interpolation is then performed between the identified colour transition points to produce a boundary for the perceived object. Thus, control points are selected at step 204 and these selected control points are processed at step 205 in order to produce a boundary for the perceived object which may then be used to remove the object from its surrounding image data, thereby allowing a post production operation to be achieved in which the object is placed within a new background.

Figure 3:
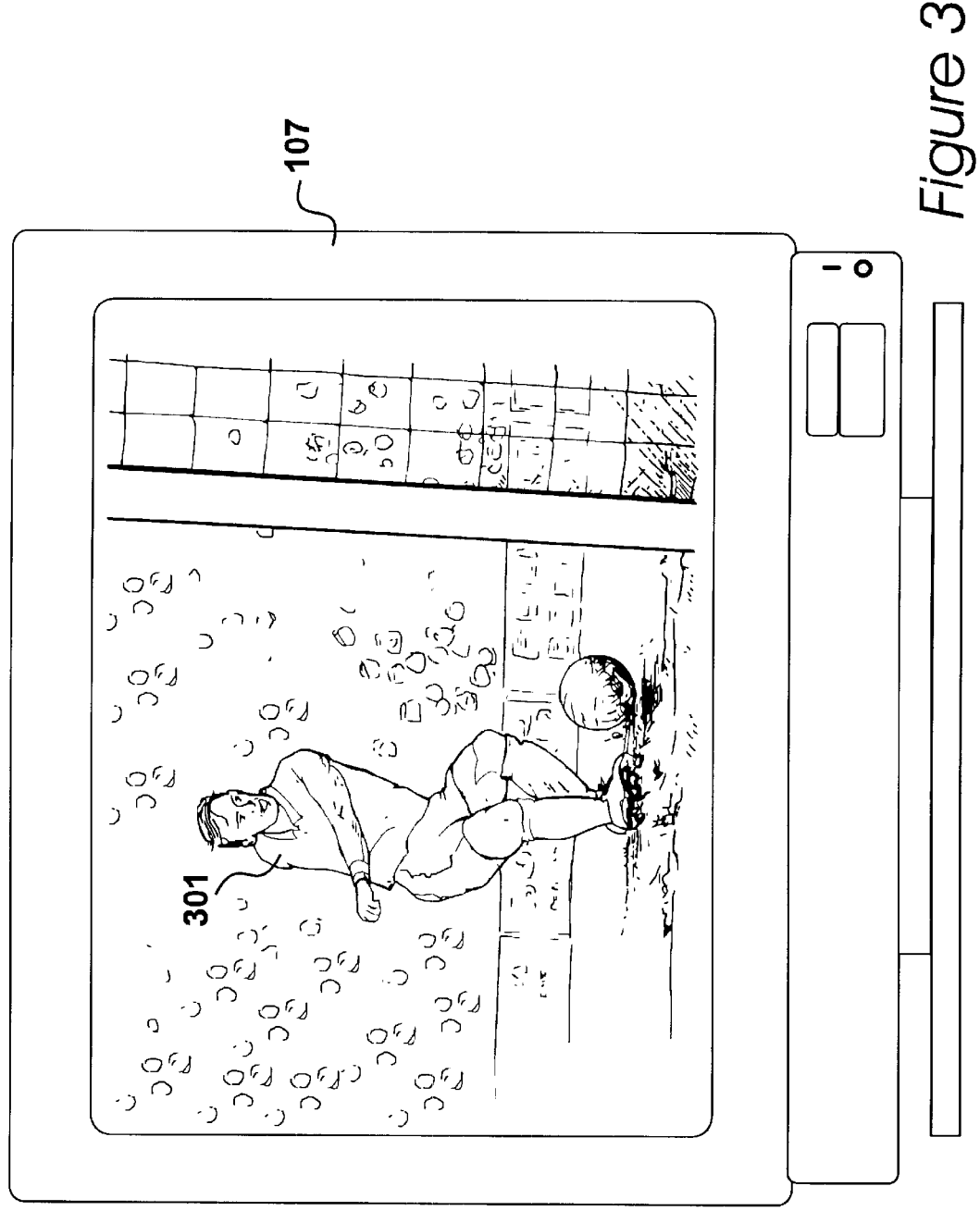
FIG. 3 illustrates an image displayed on the monitor identified in FIG. 1 upon which procedures identified in FIG. 2 are effected.

After selecting an image frame at step 203, the image is displayed on monitor 107 as shown in FIG. 3. In this example, a football match is being shown in the video clip and the post production operator shown in FIG. 1 wishes to remove a particular footballer from the clip such that said footballer may be added to another clip. In this way, it is the operator's intention to create an illusion to the effect that a football match is being played with famous players over history.

The operator wishes to remove player 301 from the image shown in FIG. 3. The player has been recorded against a distant non-focused background, parts of which are derived from the field, parts of which are derived from a surrounding boundary and parts of which are derived from images of the background crowd. Thus, although a boundary is clearly visible to the eye, it is extremely difficult to provide a technical definition which would distinguish the player from the background image and thereby generate a boundary which could be used to remove the player from the background.

Figure 4:
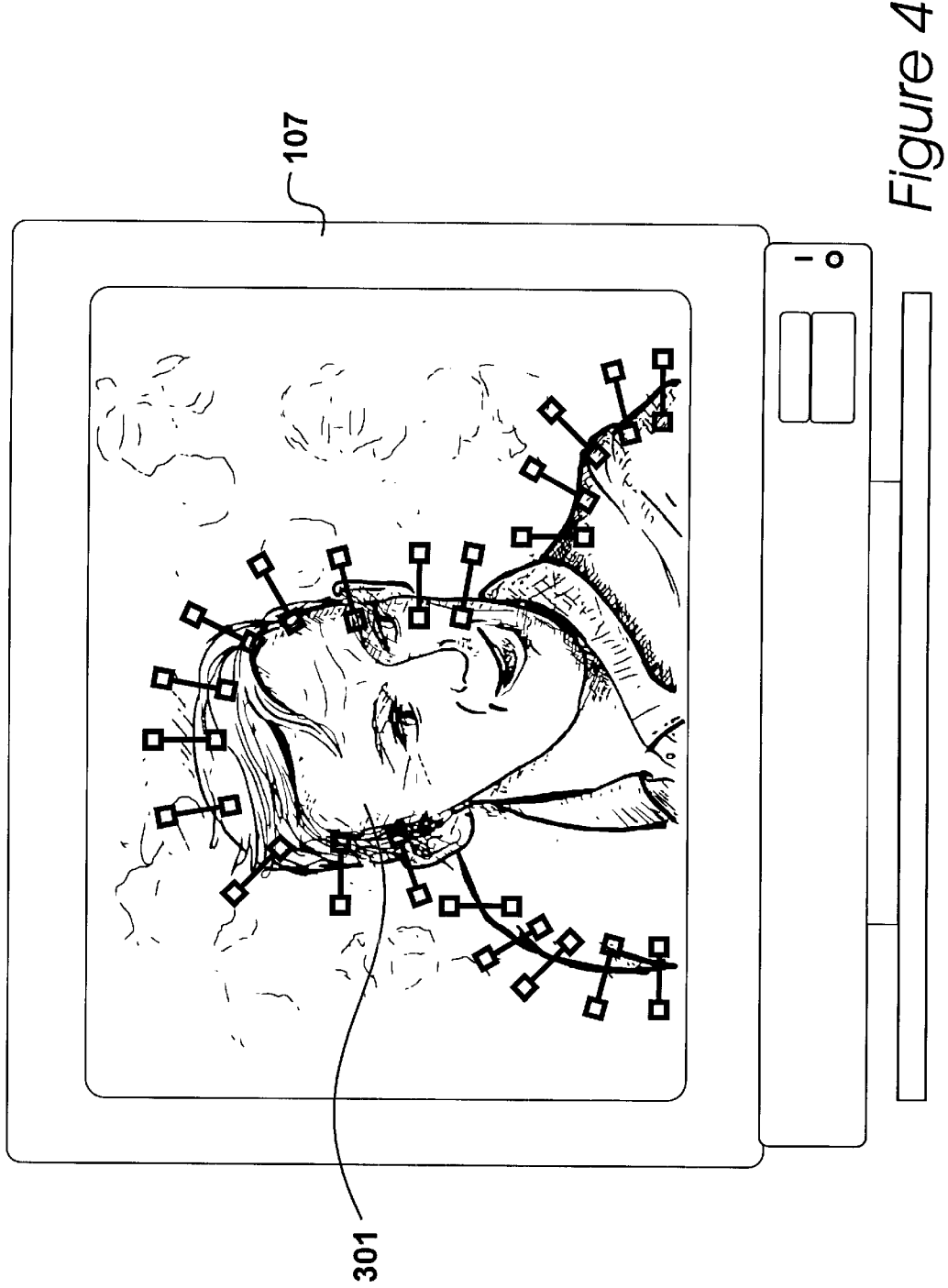
FIG. 4 shows an enlargement of the image shown in FIG. 3.

A particular region of interest in the image shown in FIG. 3 is enlarged as shown in FIG. 4. Control points are then positioned by movement of the stylus 104 to locations close to the boundary edge. The control points are positioned by an operator so as to closely follow an edge of an object within the image that is being identified. However, it should be understood that the control points do not need to be accurately positioned exactly on the transition edge and in some circumstances it may be difficult to actually identify the position of the edge.

Thus, the data processing performed is effected upon image frames defined by a plurality of pixel values. An image frame is viewed, containing a perceived object which is to be distinguished from the remainder of the image frame. An operator manually identifies control points close to the boundary of the object. Pixel values around each identified control point are then compared to define local colour transitions. Thereafter, an interpolation is performed between the colour transitions to produce a soft bounding region for the object. This bounding region may then be combined with a fill to produce a multi-bit key, matte, alpha or mask layer. This layer can then be used to selectively remove the foreground image or the background image so as to allow said components to be composited with images obtained from elsewhere.

Figure 5:
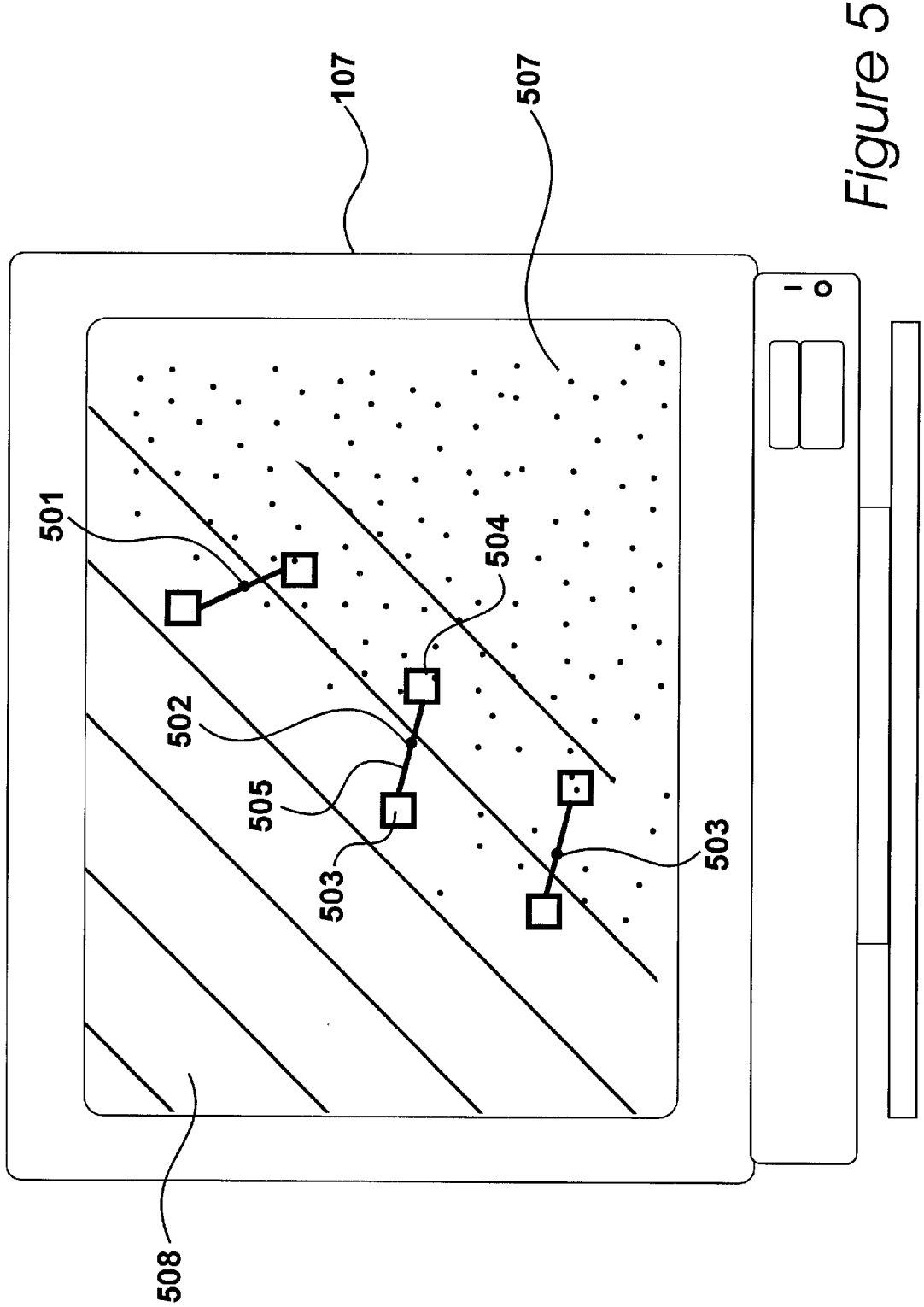
FIG. 5 shows a further enlargement of the image shown in FIG. 4.

A portion of the image shown in FIG. 4 is shown enlarged in FIG. 5 in which control points 501, 502 and 503 have been located by an operator. In this enlarged image it can be seen that a real boundary at the pixel level does not actually exist and a degree of blending is occurring so as to create the illusion of a boundary existing when the image is viewed at some distance. Thus, with such images, it is not actually possible to define a sharp transition between one object and its background and when using a mask to remove an object from a particular image frame, a soft multi-bit edge is required in order to provide the required level of blending when the object is combined with a new background image.

After locating control points 501, 502 and 503, a pair of selection boxes are generated such as selection boxes 503 and 504 which extend from a selection line 505 on either side of control point 501. In response to manual operations, the position of the selection boxes 503 and 504 may be adjusted, resulting in corresponding adjustments being made to the length and orientation of the selection line 505. The selection boxes 503 and 504 maintain their overall size, typically containing twenty by twenty pixels, with their orientation remaining fixed so as to be lined up with the x and y edges of the image frame. The selection boxes are moveable horizontally and vertically in steps of pixel boundaries, thereby ensuring that a complete collection of, typically, four hundred pixels contained within each box.

An operator positions the selection boxes 503 and 504 such that they enclose a typical region of the colour on their respective side of the notional boundary. Thus, in the present example, it may be assumed that the region 507 towards the bottom right of the image of a relatively constant light brown colour while the upper left portion 508 is of a substantially constant green colour. However, in typical images the regions 507 and 508 will include some texture, that is to say the pixels will not be of constant values, and the size of the selection boxes is made such that a typical region of the texture may be placed within said boxes.

Thus, the operator is invited to move selection box 504 to a typical region of colour 507 while performing minimal displacement from the position of control point 501. Similarly, the operator is invited to move selection box 503 to a typical portion of colour 508 again with a minimal displacement away from the control point 501. Such a process is performed for all of the selection boxes associated with control points such that, at each control point, a selection box is placed at a typical example of the colour on one side of the control point with the other selection box being placed at a typical example of the colour on the other side of the control point. Having identified the selection boxes, the processing system 103 identifies local colour transitions and interpolates between these colour transitions to produce a soft-edged mask for the selected object.

Figure 6:
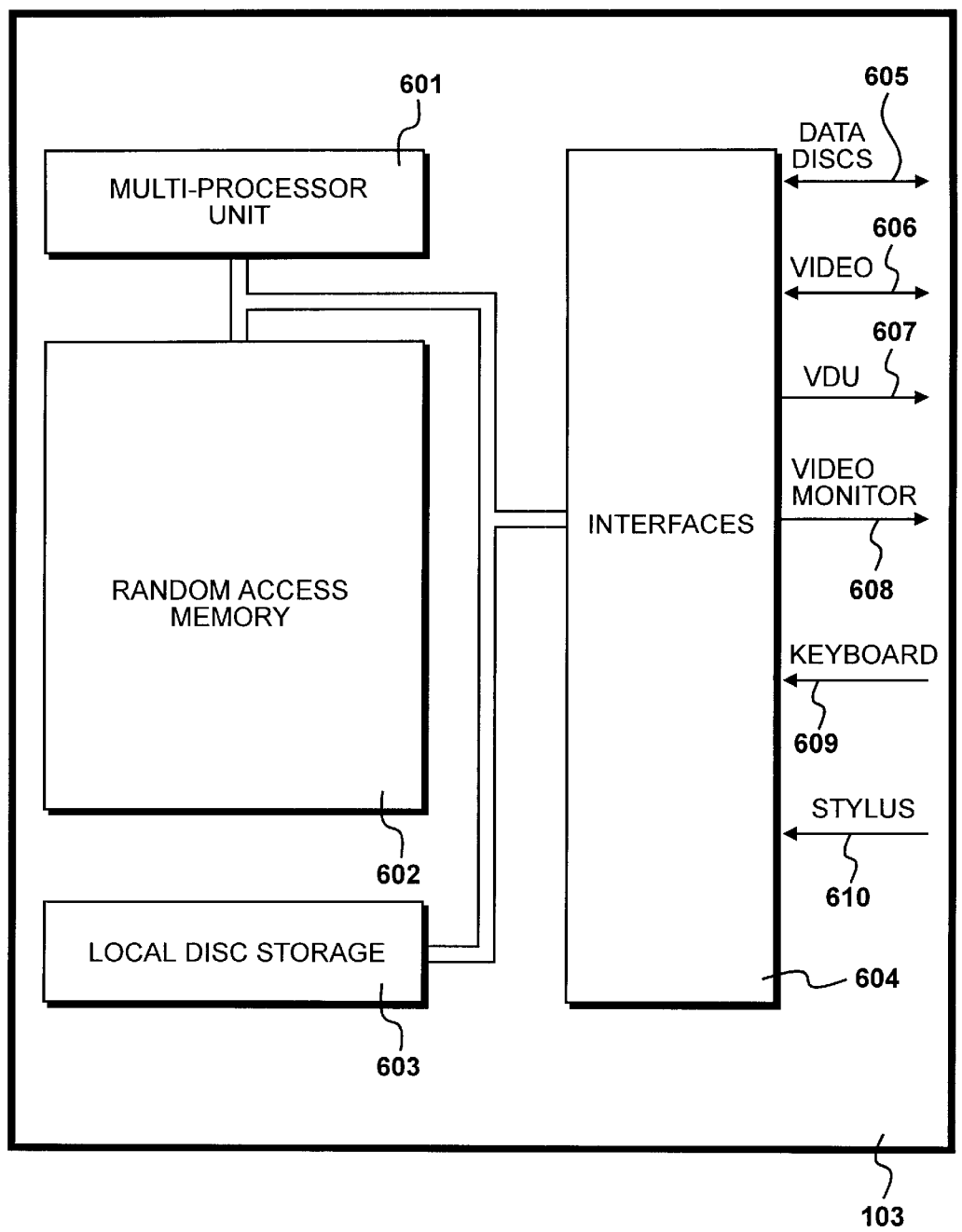
FIG. 6 shows the architecture of the processing system identified in FIG. 1.

The processing system 103 is shown in FIG. 6, having a plurality of central processor units shown generally at 601. The processors 601 communicate with a local random access memory 602, local disk storage devices 603 and the plurality of interfaces 604. Interfaces 604 provide for communication with the external data disk drives 102, via a fibre channel interface 605. Communication with video recorder 101 is performed over a video interface 606 with signals being supplied to the visual display unit 107 via an interface 607. Similarly, the video monitor 108 receives video signals over a video output 608. Input signals from keyboard 106 are received via an interface 609 and input signals from stylus 104 are received via an input interface 610.

The local disk storage device 603 stores executable instructions which may be loaded into the Random Access Memory 602 for execution by the multi-processor environment 601. Data generated by the multi-processor unit 601 may also be temporarily written to the Random Access Memory 602 which may also temporarily store image frames. Image frames are transmitted between the external storage device 102 and the Random Access Memory 602 over the fibre channel interface 605, thereby facilitating the transfer of image frames at rates exceeding their normal display rate, ie at transfer rates greater than video rate.

Figure 7:
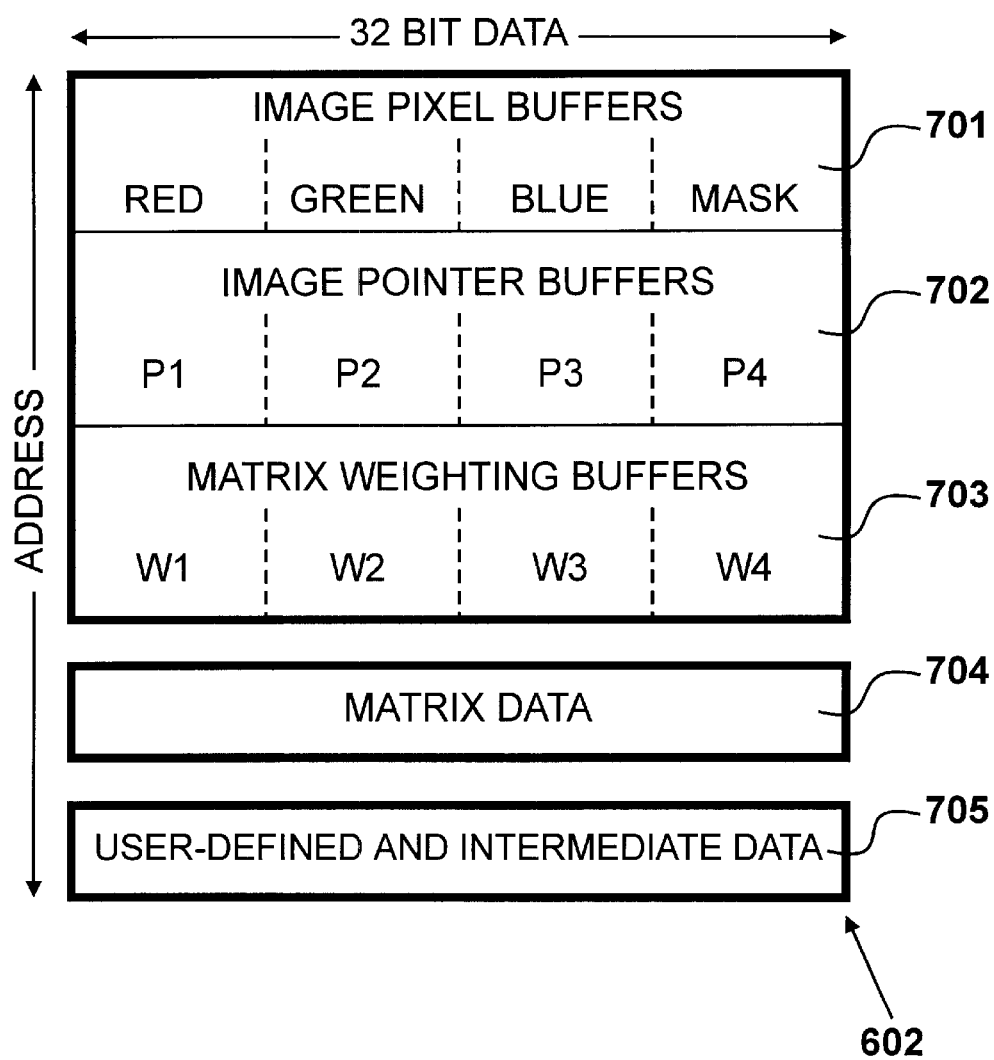
FIG. 7 identifies the allocation of storage in the Random Access Memory identified in FIG. 6.

The Random Access Memory 602 allows thirty-two bits of data to be transferred in response to an address, as illustrated in FIG. 7. The operating system of the processing system 103 is configured to transfer blocks of data so as to facilitate the transfer of pixel images between regions of memory that may be identified internally as image buffers. Thus, a region 701 of memory 602 may be identified as image pixel buffers, wherein each thirty-two bit addressable word is divided into eight bit components comprising red, green, blue and mask values. Similarly, a region 702 may be considered as matrix pointer buffers with each thirty-two bit word having eight bit components from sub-regions P1, P2, P3 and P4. Similarly, a region 703 may be considered as matrix weighting buffers, again resulting in each thirty-two bit addressable word providing components for sub-regions W1, W2, W3 and W4. Matrix data is stored in region 704 and region 705 provides for the storage of the user defined data and intermediate data values.

After the control points have been selected at step 204 and selection boxes have been defined extending from said control points, the processing system 103 processes the image data at step 205.

Figure 8:
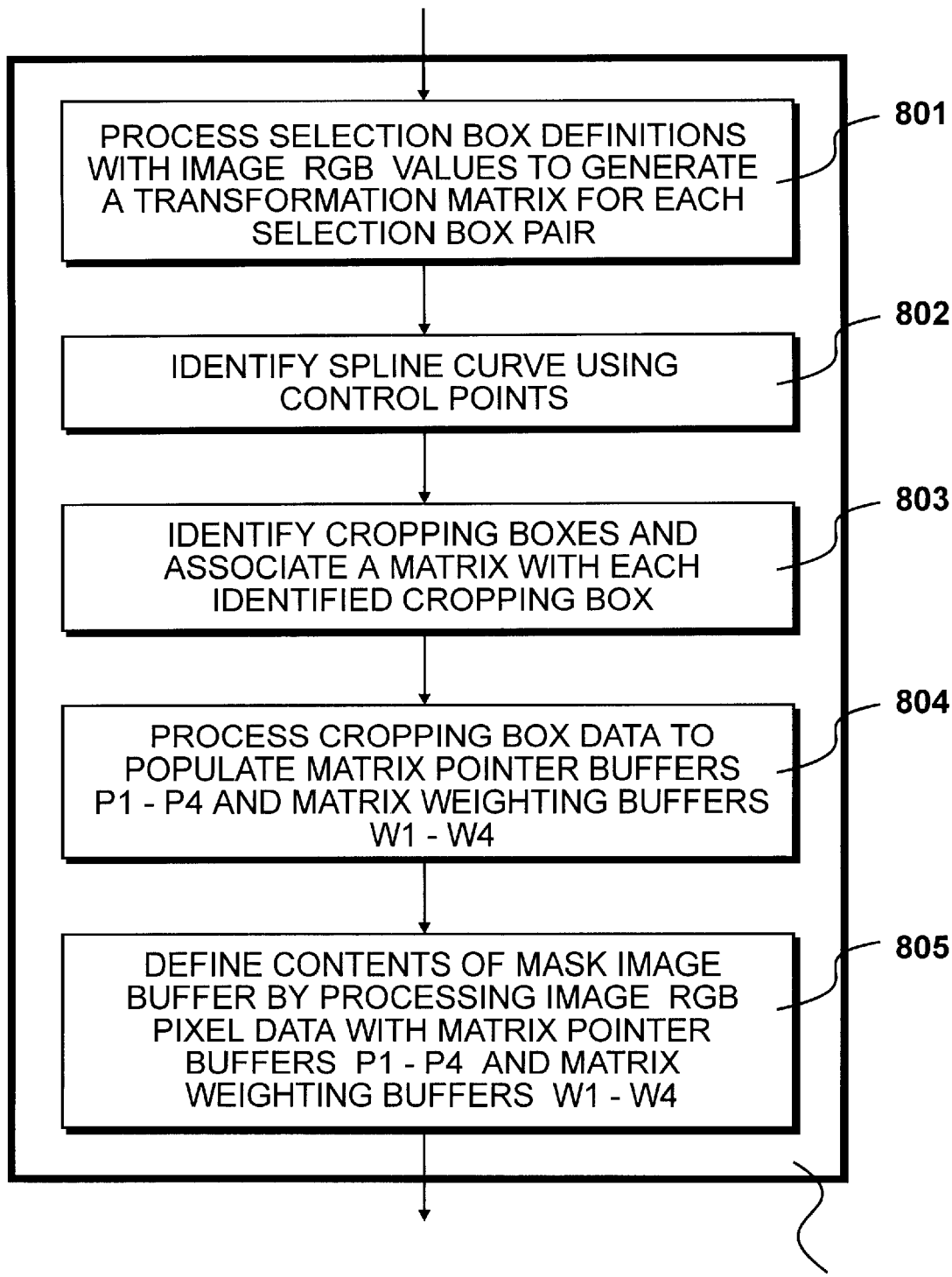
FIG. 8 details steps for the processing of image data identified in FIG. 2.

The data processing step 205 is detailed in FIG. 8, consisting of steps 801 to 805. At step 801 selection box definitions are processed with image RGB values to generate a transformation matrix for each selection box pair. The matrix transformation, operable within RGB colour-space, generates mask values which will have extents varying between zero and 255, with the intermediate values being specified by the intermediate range of colour-space between the two selection boxes.

At step 802 a spline curve is defined in response to the user identified control points, selected at step 204.

At step 803 main cropping boxes are identified with additional overlapping cropping boxes being added as necessary, with matrices processed at step 801 being associated with each of these cropping boxes. The cropping boxes define the area of the mask in which soft values will be generated by the primary process. Thereafter, other regions of the mask are completed by a more straightforward fill process so as to generate a complete masked region.

At step 804 the cropping box data is processed in order to populate the matrix pointer buffers 702 and the matrix weighting buffers 703.

At step 805 contents of the mask image buffer are defined by processing image RGB pixel data with the matrix pointer buffers P1 to P4 (702) and the matrix weighting buffers W1 to W4 (703).

Figure 9:
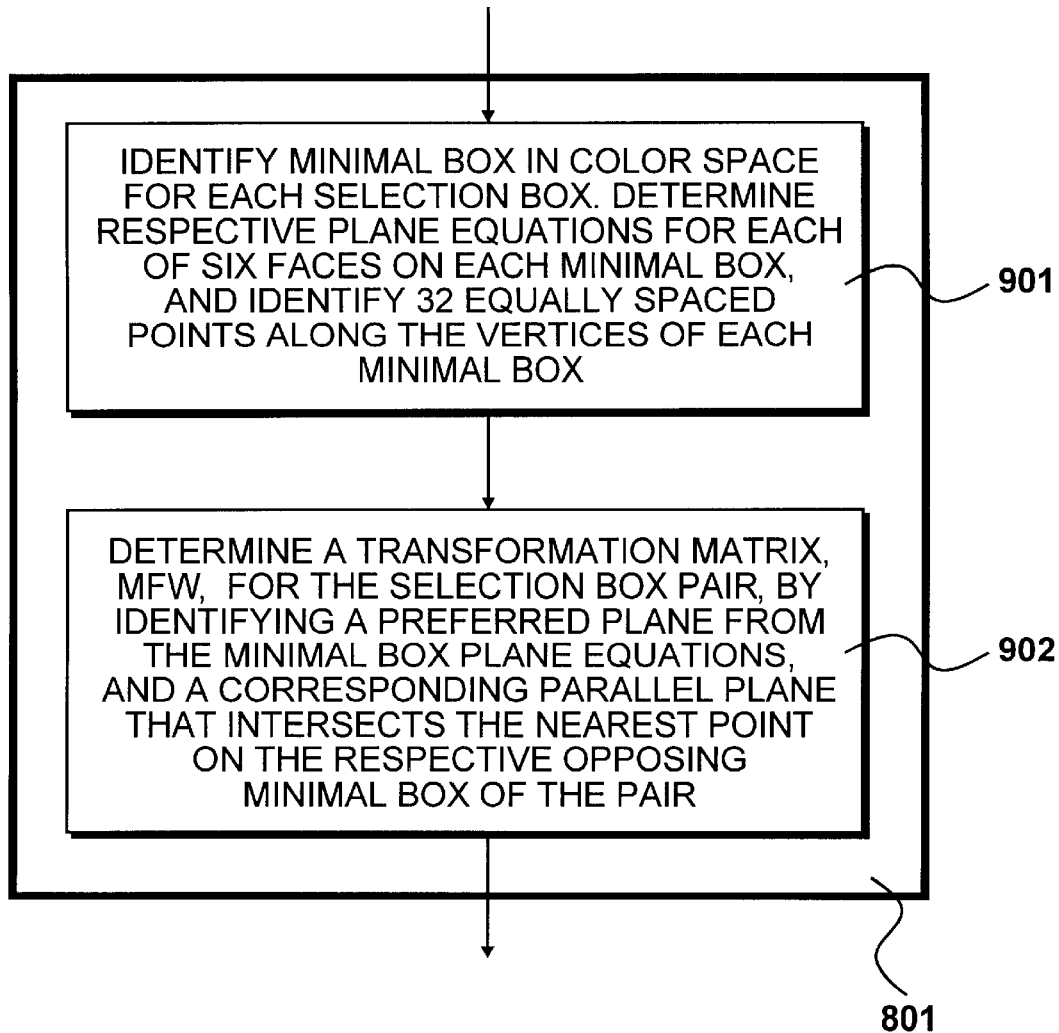
FIG. 9 details the step of processing selection box definitions identified in FIG. 8.

Step 801 for the processing of selection box definitions is detailed in FIG. 9. At step 901 a minimal box in colour-space is identified for each selection box. Respective plane equations are determined for each of six spaces on each minimal box and thirty-two equally spaced points are identified along the vertices of each minimal box.

Thereafter, at step 902 a transformation matrix mFW is determined for the selection box pair, by identifying a preferred plane from the minimal box plane equations and a corresponding parallel plane that intersects the nearest point on the respective opposing minimal box of the pair.

Figure 10:
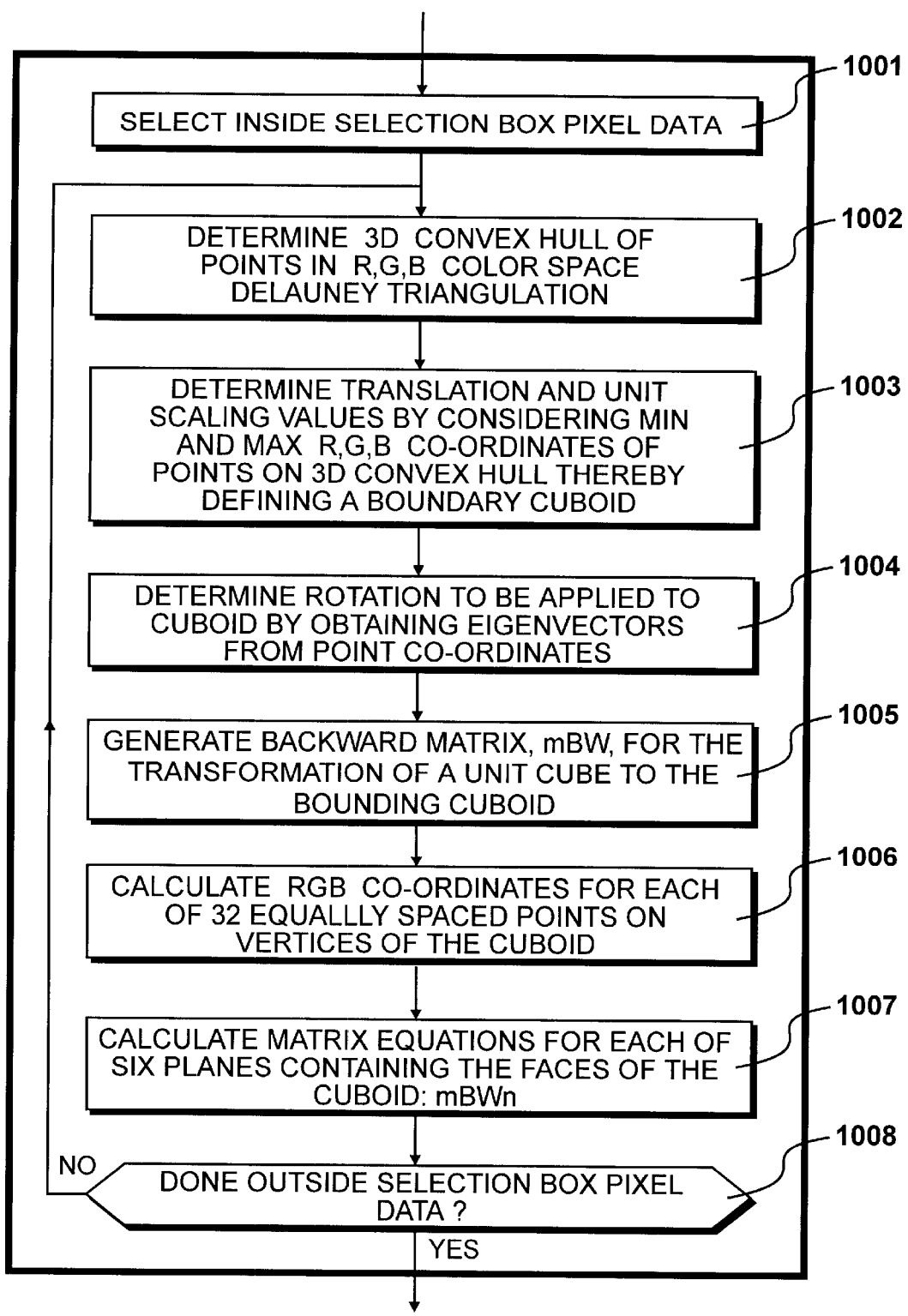
FIG. 10 details the step of identifying a minimal box in colour-space, shown in FIG. 9.

Step 901 for the identification of a minimal box in colour-space is detailed in FIG. 10. At step 1001 pixel data inside a selection box is selected and at step 1002 a three-dimensional convex hull of points in RGB colour-space is determined by the Delaunay triangulation method.

At step 1003 a translation and unit scaling values are determined by considering minimum and maximum RGB colour co-ordinates of points on the three-dimensional convex hull determined at step 1002.

At step 1004 a rotation to be applied to the convex hull is determined by obtaining eigenvectors from point co-ordinates and at step 1005 a backward matrix mBW is generated for the minimal box containing the convex hull.

At step 1006, RGB co-ordinates are calculated for each of the thirty-two equally spaced points on vertices of the minimal box. Thereafter, at step 1007 matrix equations are calculated for each of the six planes containing the faces of the minimal box, represented as mBW one to six. At step 1008 a question is asked as to whether all of the outside selection box pixel data has been considered and when this question is answered in the negative control is returned to step 1002.

Figure 11:
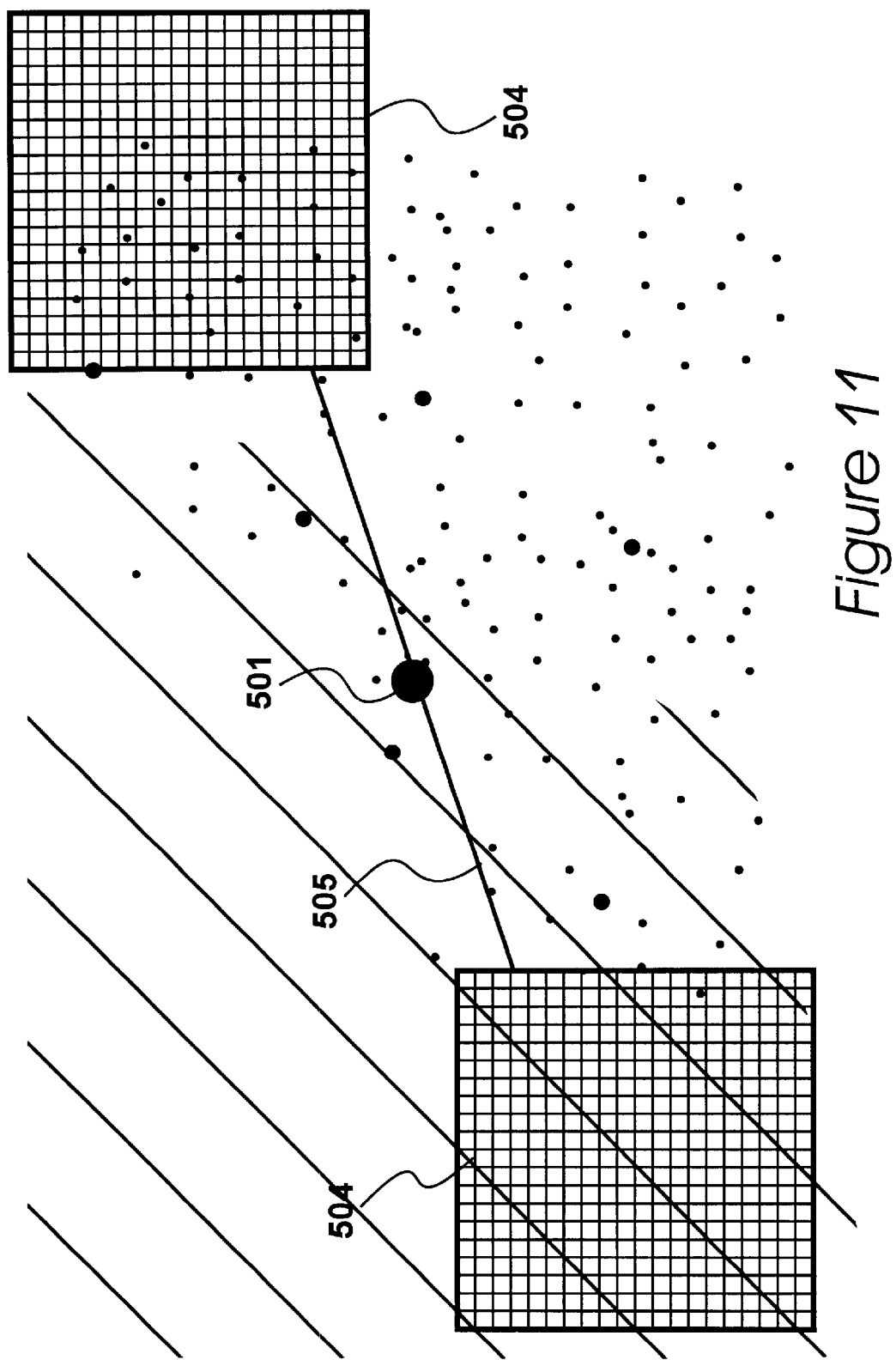
FIG. 11 details the position of selection boxes identified in FIG. 5.
Figure 12:
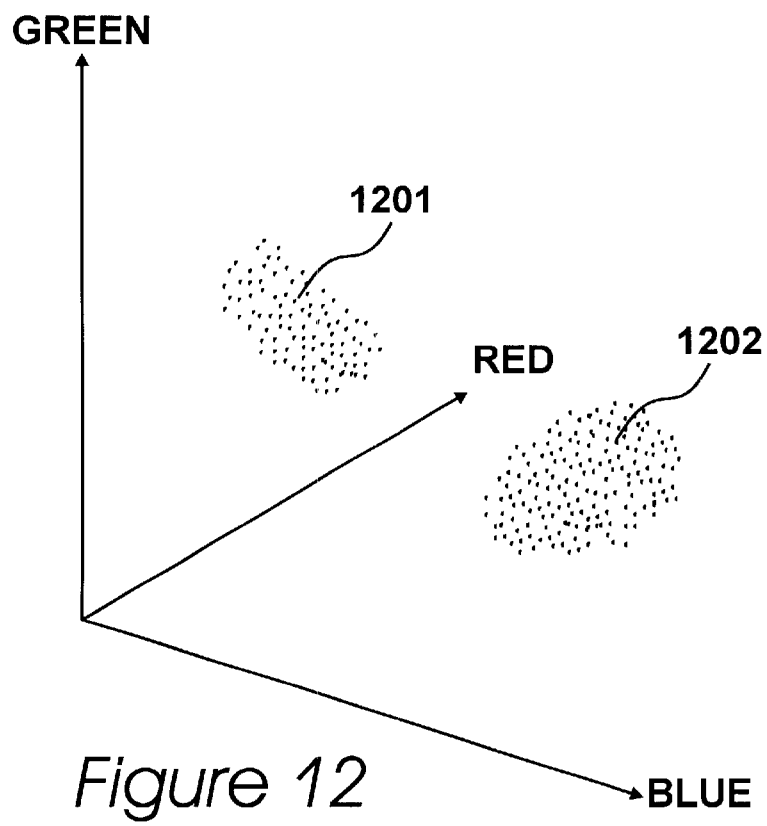
FIG. 12 illustrates collections of pixel points represented in three-dimensional colour-space.

A user has positioned selection boxes as shown in FIG. 5 and selection boxes 503 and 504 are shown detailed in FIG. 11. Selection boxes may only be positioned at pixel boundaries, therefore selection box 503 covers an array of twenty by twenty pixels with selection box 504 encompassing a similarly sized array of pixels. Thus, when selection step 1001 occurs, the selection occurs at clearly defined pixel boundaries and there is no necessity to perform sub-pixel filtering. T The pixels selected at step 1001 are now considered by the processing system 103 in three-dimensional colour-space. Three-dimensional colour-space, with red, green and blue axes is illustrated in FIG. 12. Each pixel read from a selection box, such as selection boxes 503 and 504, is considered as a point having a geometrical position in colour-space. Thus, pixel values read from selection box 503 are represented as a "cloud" 1201 in colour-space, with pixel values read from selection box 504 being represented as a similar cloud 1202 in colour-space; distinct and separate from cloud 1201.

Figure 13:
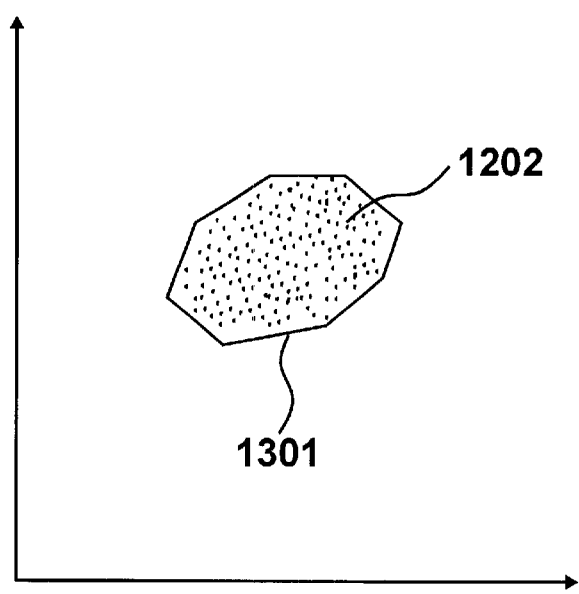
FIG. 13 shows a convex hull surrounding picture points in a two-dimensional representation of colour-space.

At step 1002 a three-dimensional convex hull is defined surrounding each of clouds 1201 and 1202. The nature of a convex hull may be considered in a simplified situation, as shown in FIG. 13, in which the hull is being defined as a two-dimensional perimeter. The two-dimensional perimeter 1301 is that which would be obtained by placing an elastic constraint around the points, thereby providing the minimum surface area which contains all of the points in the cloud.

Figure 14A:
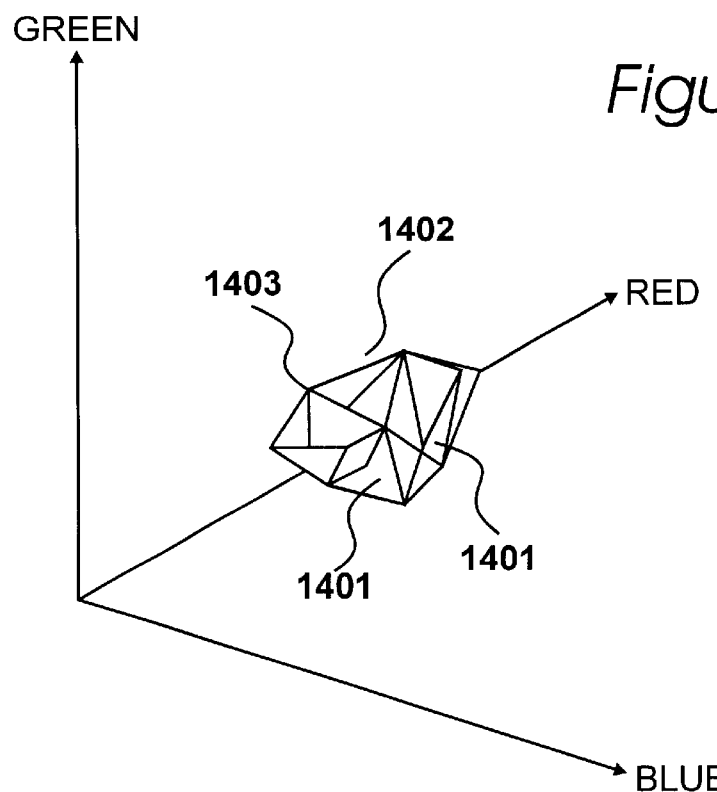
FIG. 14A represents a convex hull in three-dimensional colour-space.

A three-dimensional representation of such a convex hull is shown in FIG. 14A, in which a hull, in RGB colour-space, has been defined for the three-dimensional cloud 1202. Thus, a collection of individual points has now been contained within a plurality of polygons 1401 to produce an enclosed three-dimensional object 1402. It should also be appreciated that each vertex 1403 of a convex hull 1402 originated as an actual pixel position in three-dimensional colour-space.

At step 1003 translation and scaling values are determined by considering the minimum and maximum values of RGB components for positions on the convex hull. Thus, considering the convex hull as shown in FIG. 14, points are identified on the surface of the hull which have a minimum red value, a maximum red value, a minimum green value, a maximum green value, a minimum blue value and a maximum blue value, which are represented as Rmin, Rmax, Gmin, Gmax, Bmin and Bmax respectively.

Further calculations performed at step 1003 are detailed in FIG. 15. A central co-ordinate in the red dimension is calculated by adding the Rmin value to the Rmax value and dividing the sum by two. Similarly, the central co-ordinate position along the green axis is given by the sum of Gmin and Gmax divided by 2, with a similar position for the central co-ordinate along the blue axis being given as the sum of Bmin+Bmax÷2.

Sizing values are also calculated at step 1003 and a sizing value for the box along the red axis is given by Rmax minus Rmin divided by 2. Similarly the size of the box along the green axis is given by Gmax minus G min divided by 2 and a similarly size along the blue axis by Bmax minus Bmin divided by 2.

Operations performed for the calculation of eigenvectors, identified at step 1004, are detailed in FIGS. 16 and 17.

Figure 18:
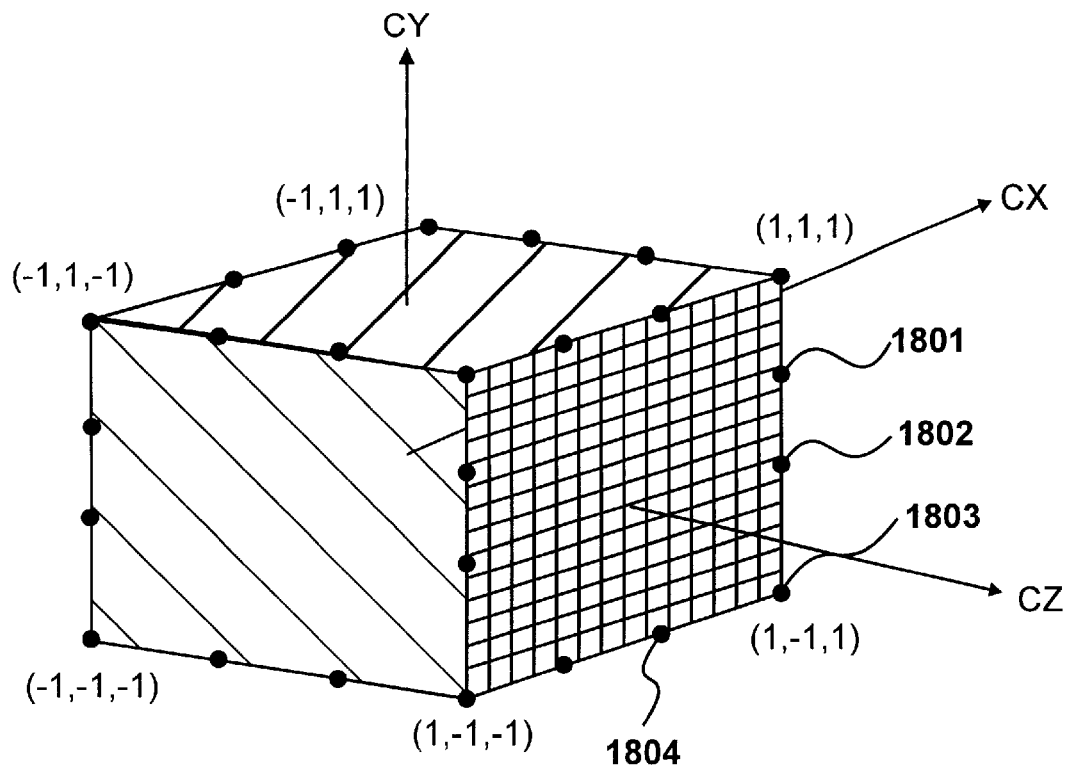
FIG. 18 illustrates a transformed bounding box.

A unit bounding box is shown in FIG. 18, centrally located at the origin (0,0,0,) of cx, cy, cz colour-space.

Figure 14B:
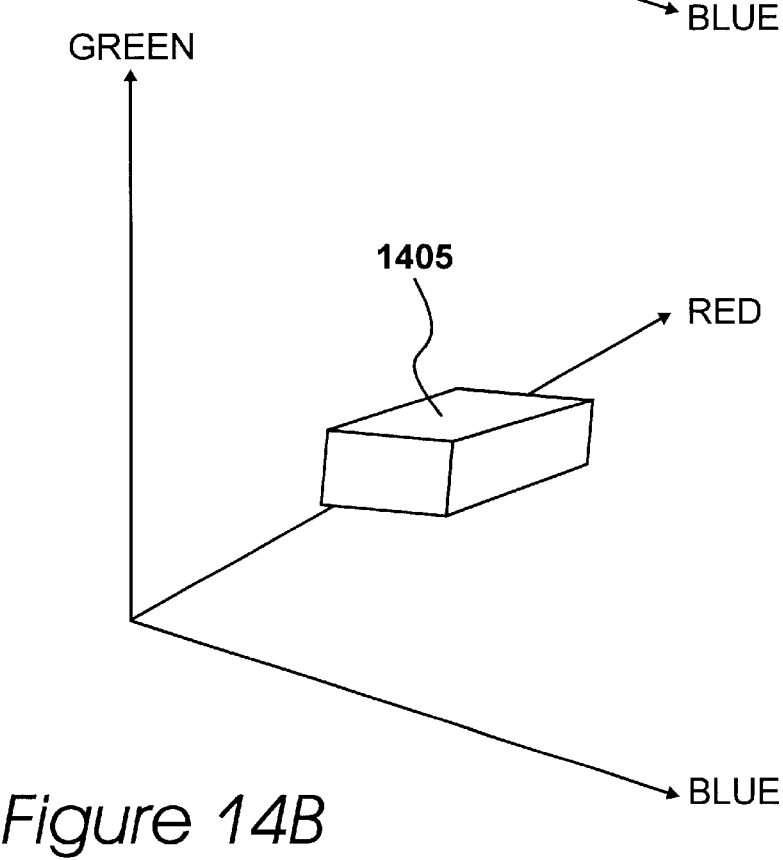
FIG. 14B illustrates a bounding cuboid in three-dimensional colour-space.

The identification of maximum and minimum extents in the three dimensions of red, green and blue for the convex hull 1402 allow a bounding cuboid 1405 to be defined as shown in FIG. 14B.

The calculation of the central vertex of bounding cuboid 1405 is defined by co-ordinates Rc, Gc, Bc determined in accordance with the procedures identified in FIG. 15. This translation effectively defines how the origin, that is the central position of the unit box shown in FIG. 18, would be translated to the centre of the bounding cuboid. 1405.

Scaling values Rs, Gs and Bs calculated in accordance with the procedures identified in FIG. 15 effectively define the extent of scaling required in the R, G and B dimensions in order to scale the unit box shown in FIG. 18 to the size of the bounding cuboid shown in FIG. 14*b*. Similarly, the matrix defining a rotationing colour-space, calculated in accordance with the procedures identified in FIG. 17, defines a rotation required in order to rotate the unit box shown in FIG. 18 to the orientation of the bounding cuboid 1405 shown in FIG. 14*b*. Thus, combining these three components of a translation, scaling and rotation, it is possible to define a complete transformation which would transform the unit box of FIG. 18 to the bounding cuboid 1405 of FIG. 14*b*, as required at step 1005.

The transformation matrix calculated at step 1005 allows any point of the unit box shown in FIG. 18 to be transformed to an equivalent position on the bounding cuboid 1405. At step 1006 thirty-two equally spaced points are identified on the unit bounding box, of which 1801, 1802, 1803 and 1804 are examples. The co-ordinates of these points on the unit box remain constant and are therefore known for each application of the process. Similarly located points on the bounding cuboid 1405 are determined by applying the matrix transformation generated at step 1005 to the co-ordinates of the points in the unit box, thereby generating thirty-two equally spaced points on the vertices of the cuboid 1405.

In addition to transforming the vertices 1801 to 1832, a similar transformation is also applied to the six bounding planes, three of which are shown shaded in FIG. 18, at step 1007. Thus, having completed step 1007 it is possible to define bounding cuboid 1405 in terms of thirty-two equally spaced vertices in combination with six plane equations.

At step 1008 a question is asked as to whether all of the selection box pixel data has been considered and when this question is answered in the negative control is returned to step 1002.

Figure 19:
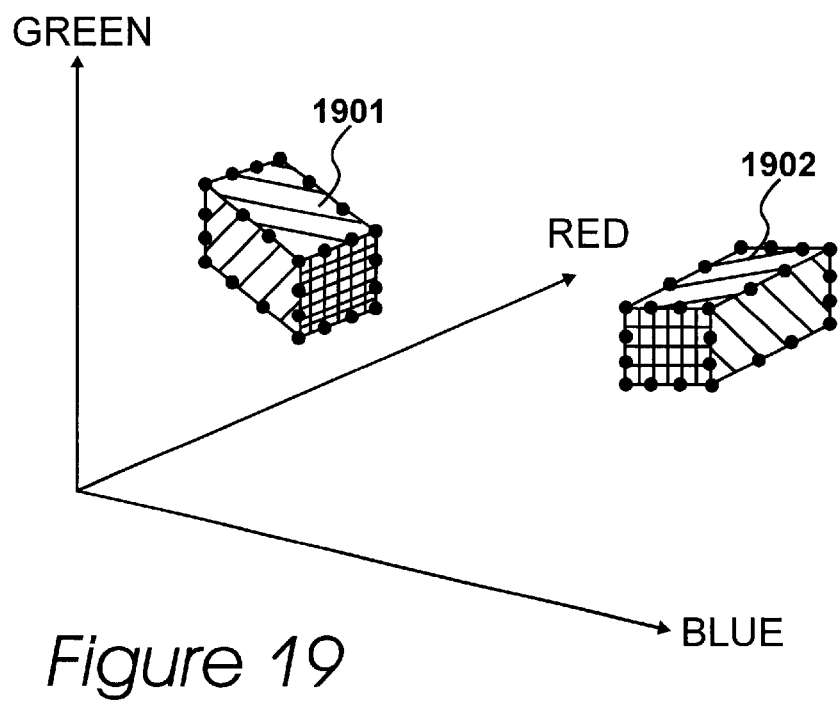
FIG. 19 illustrates two colour-space bounding boxes defined in response to the selection of a control point.

For each selected control point, such as control point 501, two selection boxes are defined, 503 and 504 such that for each control point two bounding cuboids would be specified, in terms of their vertices and planes, as shown in FIG. 19. Thus, selection box 503 identifies pixels which are represented as cloud 1201 in colour-space. This cloud of pixels is defined in terms of a convex hull from which a bounding cuboid is calculated. The bounding cuboid is then defined as a transformation matrix, from the unit box position shown in FIG. 18, to be represented as a collection of vertices and bounding planes 1901. A similarly transformation is performed with pixel values derived from selection box 504, such that these pixels are represented as a cloud 1202, resulting in a bounding cuboid, specified by vertices and bounding planes, 1902. Transformation from the pixel position shown in FIG. 11 to the bounding cuboid shown in FIG. 19 is performed in accordance with procedure 901.

Figure 20A:
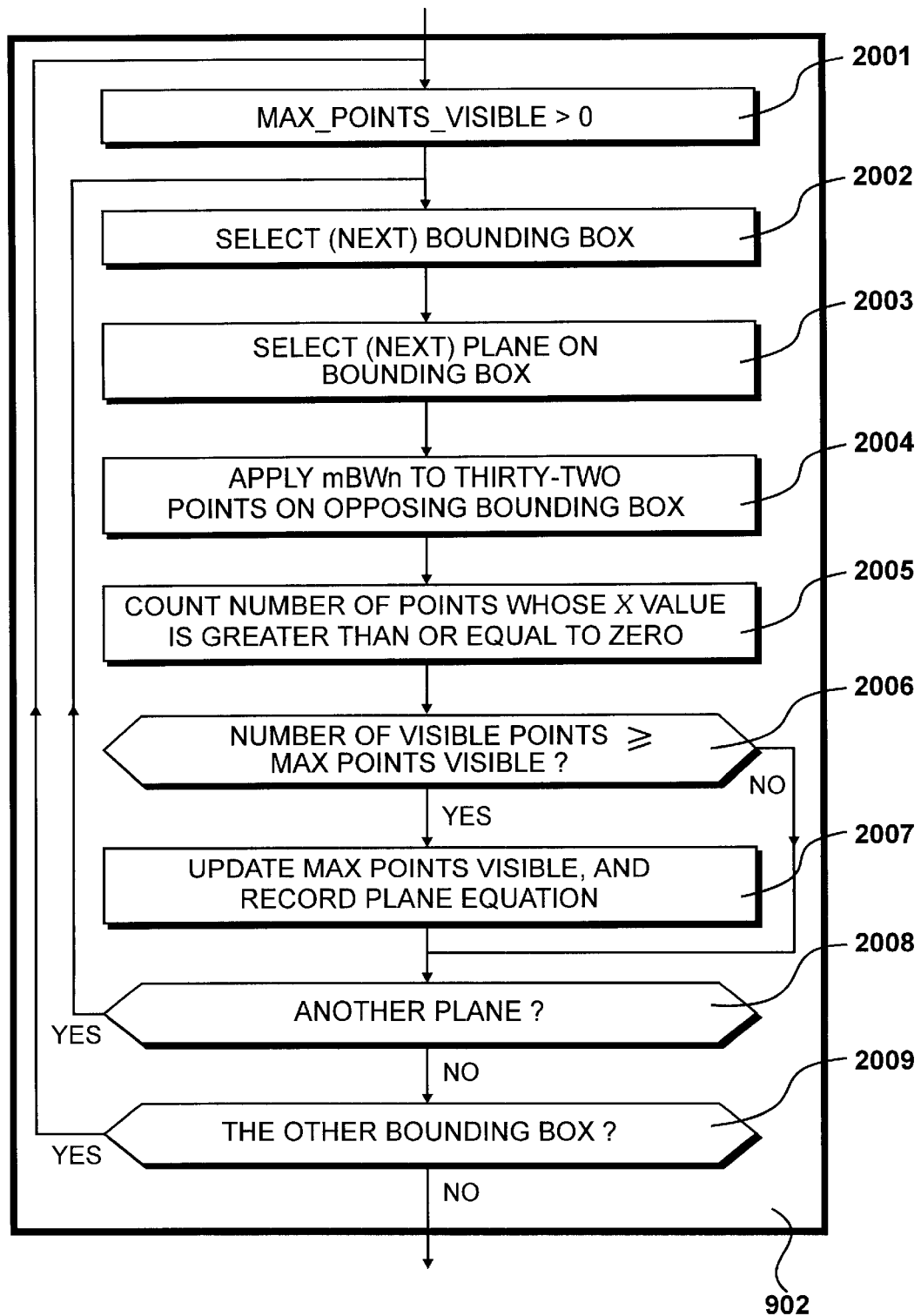
FIGS. 20A and 20B detail procedures for the determination of a transformation matrix identified in FIG. 9.
Figure 20B:
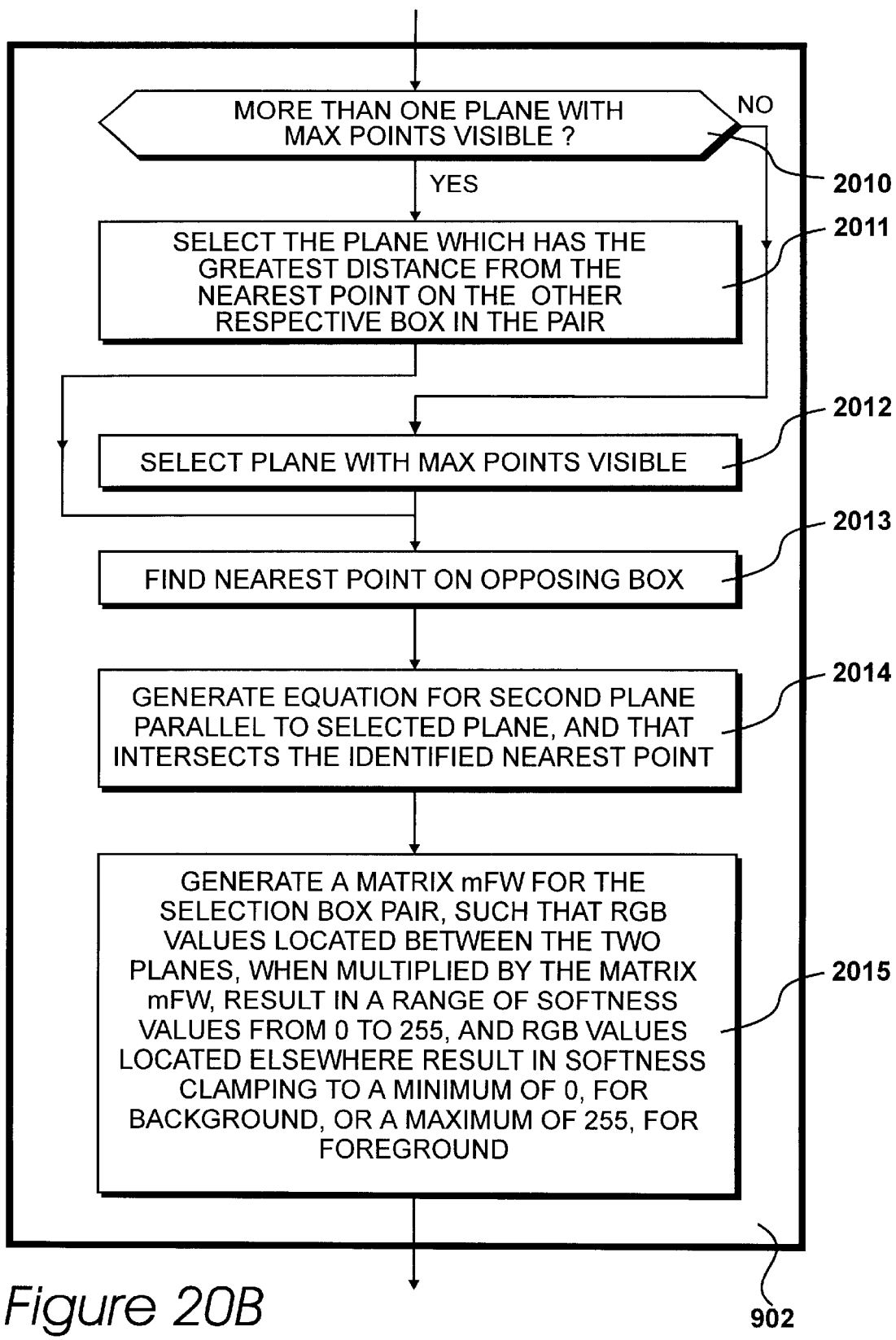

Procedure 902 is detailed in FIGS. 20A and 20B. At step 2001 a variable max_points_visible is set to zero and at step 2002 the next bounding box is selected. At step 2003 the next plane on the box selected at step 2002 is selected whereafter, at step 2004 the equation for the plane is applied to each of the thirty-two points on the opposing bounding cuboid so as to determine whether each of said points is in-front of the selected plane or behind the selected plane.

At step 2005 the number of points lying in-front of the plane is totalled so as to provide a viability count for that particular plane. At step 2006 the number of points in-front of the plane is compared against the variable max_points_visible and if the new value is greater than the previously stored value, resulting in the question asked at step 2006 being answered in the affirmative, the variable is updated at step 2007. Alternatively, if the question asked at step 2006 is answered in the negative, to the effect that the number of visible points is less than a previously determined maximum, step 2007 is bypassed.

At step 2008 a question is asked as to whether another plane is to be considered and when answered in the affirmative control is returned to step 2003 whereupon the next plane is selected. Eventually all of the planes will have been selected resulting in the question asked at step 2008 being answered in the negative.

The operations are performed for each bounding box pair therefore a question is asked at step 2009 as to whether another bounding box is to be considered. When answered in the affirmative control is returned to step 2002 whereupon the next bounding box is selected and the process repeated for the six planes of the newly selected bounding box.

After both of the bounding cuboids have been considered, the question asked at step 2009 will be answered in the negative whereupon a question is asked at step 2010 as to whether more than one plane has the maximum number of visible points. If this question is answered in the affirmative the plane is selected which has the greatest distance from the nearest point on the other respective box in the pair. Thus, when two planes are identified, the greatest distance is selected so as to provide a greater distance for a gradient of blending to be generated.

If only one plane is present with the maximum number of visible points, resulting in the question asked at step 2010 being answered in the negative, the plane with the maximum number of visible points is selected at step 2012.

At step 2013 the nearest point on the box opposing the selected plane is identified and at step 2014 an equation is generated for a second plane, parallel to the selected plane, which also intersects the nearest point identified at step 2013.

At step 2015 a forward matrix mFW is generated for the selection box pair, such that RGB values located between the two planes, when multiplied by the matrix mFW, result in a range of softness values from zero to 255. However, when RGB values are selected from elsewhere, the softness value is effectively clamped to a minimum of zero for the background and to a minimum of 255 for the foreground.

Procedures 2002 to 2008 are repeated for each bounding box. The overall process is only concerned with identifying a plane on either box which, when looking out from the surface of the plane, has a majority of points on the co-operating box visible. Thus, the selected bounding plane may be derived from either of the cuboids such that the max point visible variable is only set once.

Figure 21A:
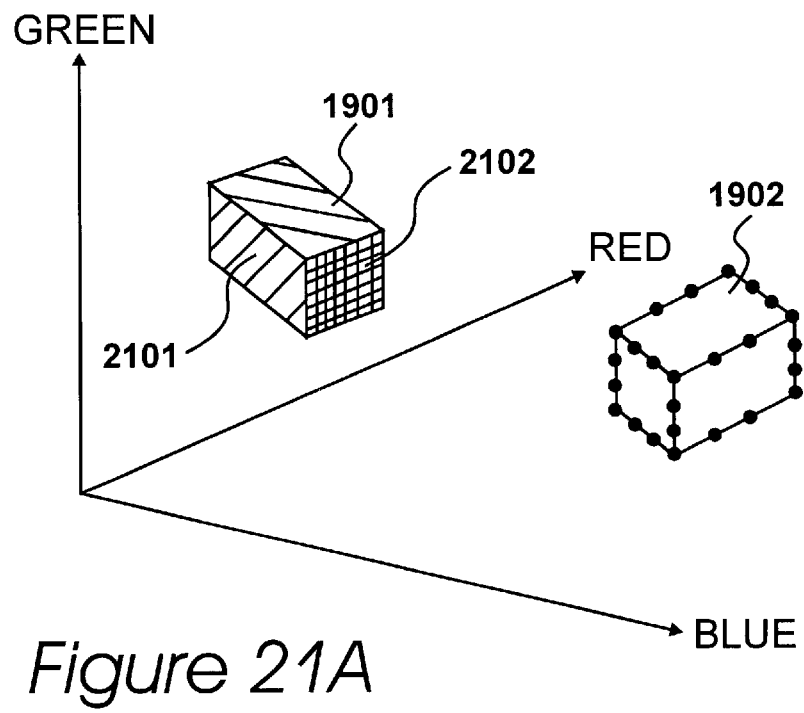
FIGS. 21A and 21 illustrate calculations performed with respect to the bounding boxes.
Figure 21B:
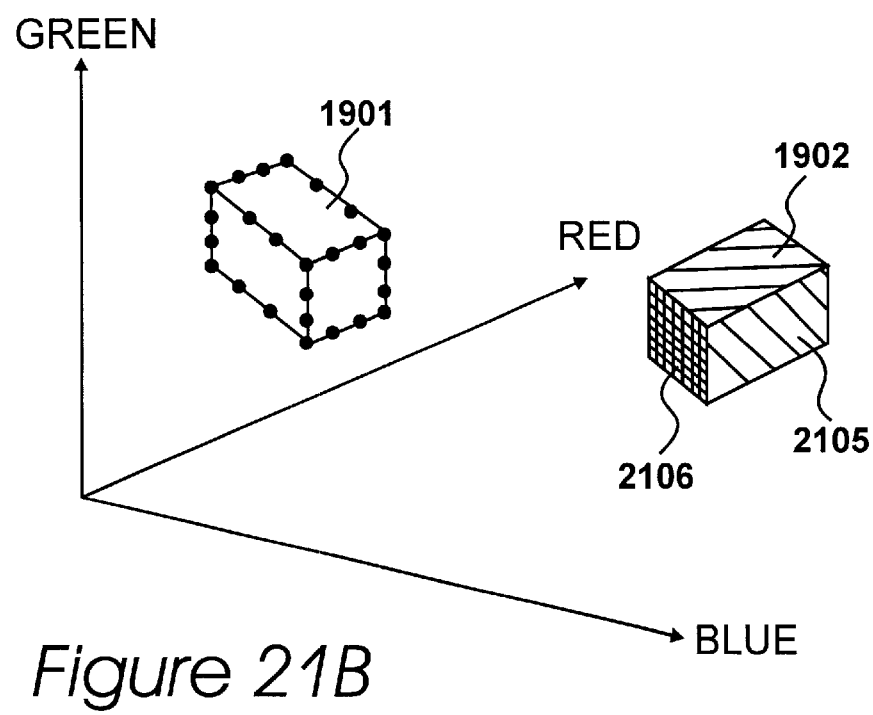

A representation of the inter-relationship of planes and points for a first iteration of this loop is illustrated in FIG. 21A with a similar representation of the second iteration being illustrated in FIG. 21B. Thus, on the first iteration as shown in FIG. 21A points, such as points 1801, 1802 etc, on box 1902 are being considered with respect to the planes, such as planes 2101 and 2102 present on box 1901. On the second iteration, as shown in FIG. 21B, points on box 1902 are being considered with respect to planes, such as planes 2105 and 2106 on box 1902. Thus, there are a total of twelve planes and the purpose of the procedure shown in FIG. 20a is to identify one plane from this twelve from which the maximum number of points in the opposing box are visible.

Figure 22:
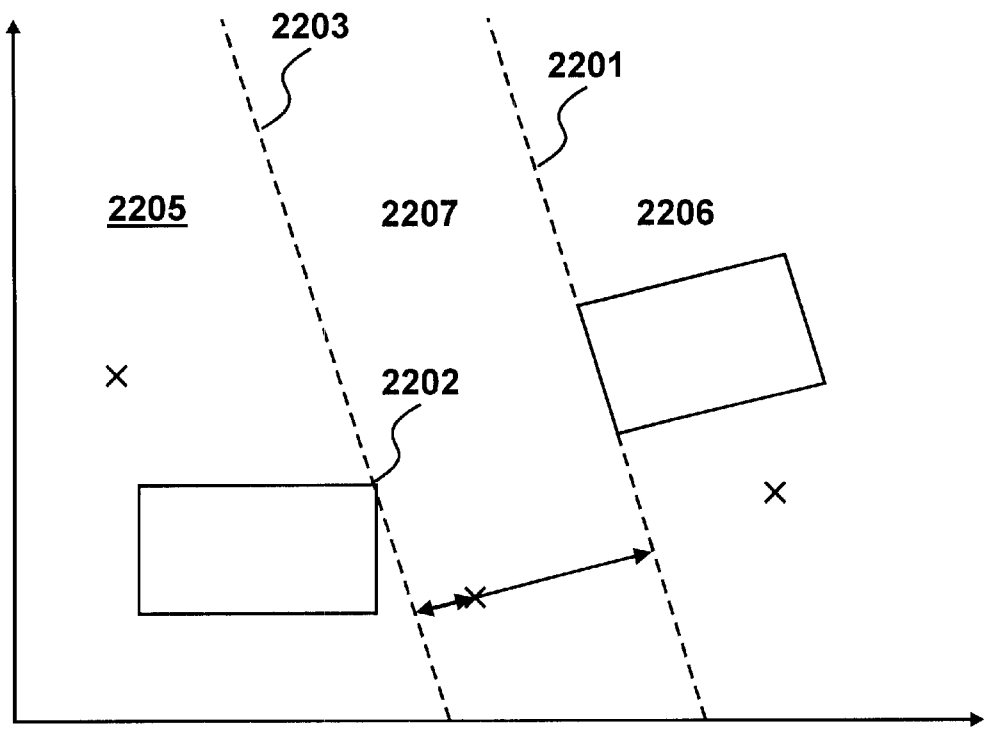
FIG. 22 illustrates the selection of planes based on the position of bounding boxes.

At step 2012 a plane with the maximum number of points visible has been selected which, in FIG. 22 is illustrated two-dimensionally as plane 2201. At step 2013 a nearest point on the opposing box is identified which, in the example shown in FIG. 22, would be point 2202.

At step 2014 a second plane equation is generated representing plane 2203 which is parallel to plane 2201.

Planes 2201 and 2203 effectively divide the whole of the colour-space into three regions. In a first region 2205 a mask value may be set to full-on. Similarly, in region 2206 the mask value may be set to full-off. In the intermediate region 2207, between the two planes, intermediate smoothness value between 1 and 244 are provided proportionally independent upon their distance between the full-on plane 2203 and the full-off plane 2201.

The procedures detailed above provide for the calculation of a local transformation matrix which, given a value in colour-space, will generate an appropriate soft contribution to the mask values. As identified at step 801, such a procedure is performed for each identified control point selected by an operator, as illustrated in FIG. 5.

Figure 23:
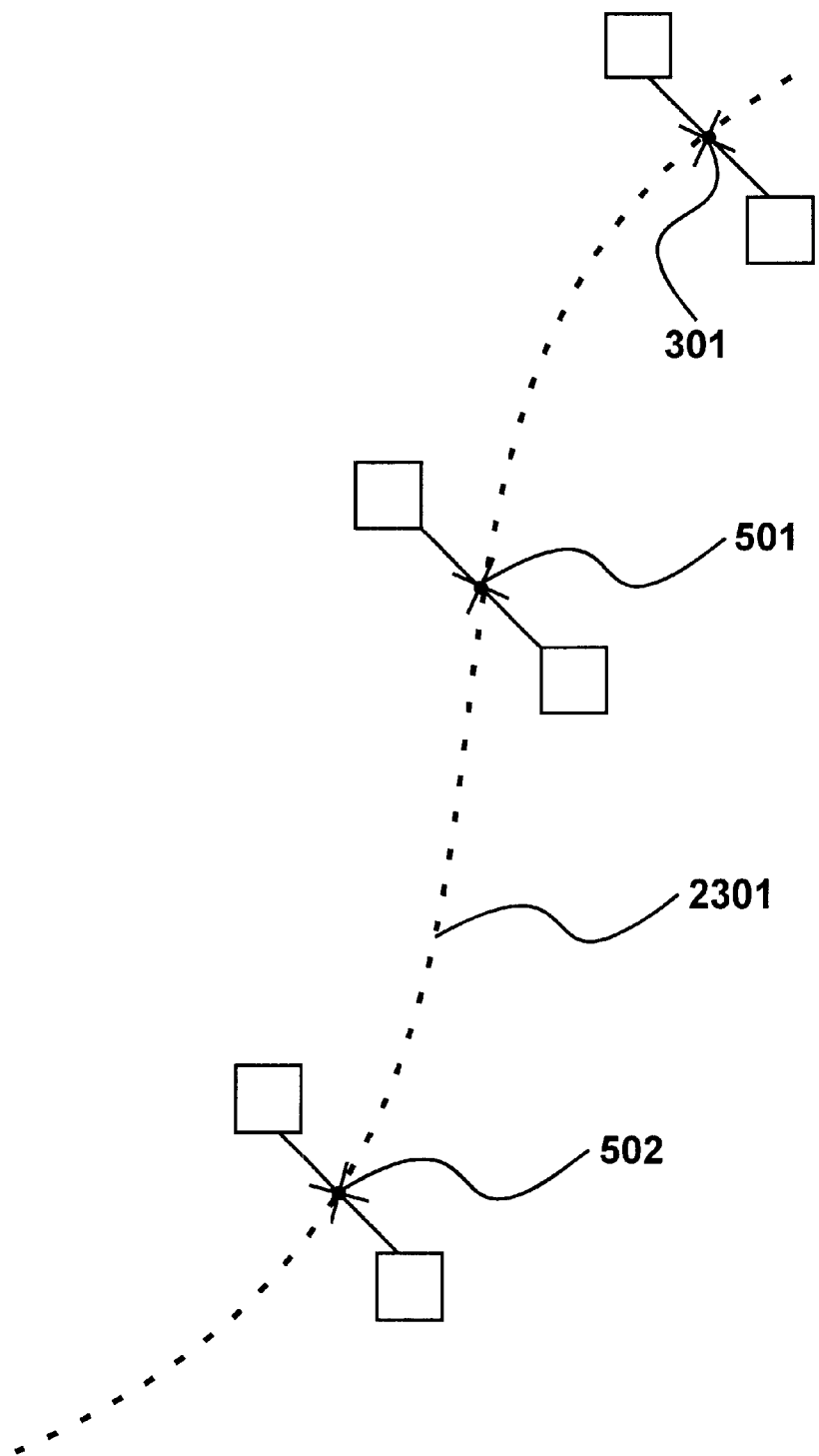
FIG. 23 illustrates the generation of a spline connecting manually identified control points.

At step 802 a spline curve is identified with respect to the identified control points, as illustrated in FIG. 23. Given a collection of points in a two-dimensional plane, the processing system 103 is equipped to generate a spline of the type shown in FIG. 23, in which the manually identified control points 301, 501 and 502 are connected by splining component points 2301.

It should be emphasised that the spline component points do not represent a boundary edge and are merely used to facilitate the generation of mask blending values at positions intermediate to the manually selected control points.

Figure 24:
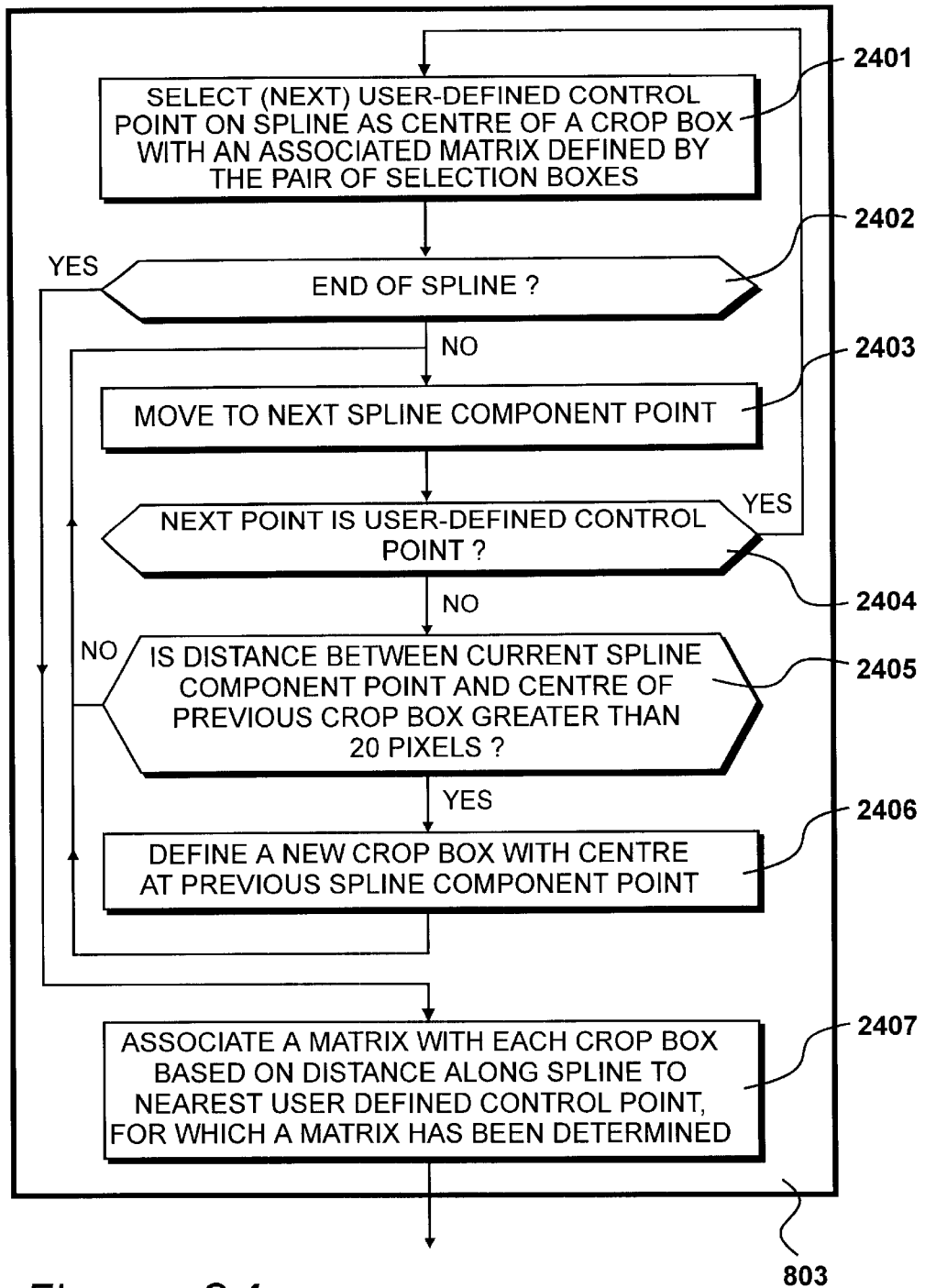
FIG. 24 details the step of identifying cropping boxes identified in FIG. 8.

Step 803 for the identification of cropping boxes and the association of a matrix with each of the identified cropping boxes is detailed in FIG. 24. At step 2401 a user defined control point is selected as the centre of a cropping box, along with its associated matrix defined by the associated pair of selection boxes.

The process traverses along the spline shown in FIG. 23 and at step 2402 a question is asked as to whether the end of the spline has been reached. When this question is answered in the negative, the process considers the next spline component point at step 2403 and a question is then asked at step 2404 as to whether this next point has been user defined. If the question asked at step 2404 is answered in the negative, a question is asked at step 2405 as to whether the distance between the currently selected spline component point and the centre of the previous crop box is greater than twenty pixels. If this question is answered in the affirmative, a new crop box with a centre at the spline component point selected at step 2403 is defined at step 2406, whereafter control is returned to step 2403 for the next spline component point to be selected.

If the question asked at step 2405 is answered in the negative, to the effect that the distance between the current spline component point and the centre of the previous crop box was not greater than twenty pixels, control is returned to step 2403 whereupon the next spline component point is selected.

Eventually, the end of the spline will have been reached, resulting in the question asked at step 2402 being answered in the affirmative, whereupon, at step 2407, a matrix is associated with each crop box based on the distance along the spline to the nearest user defined control point for which a matrix has been determined. Thus, for each position where a crop box is required, one of the previously calculated matrices is associated therewith.

Figure 25:
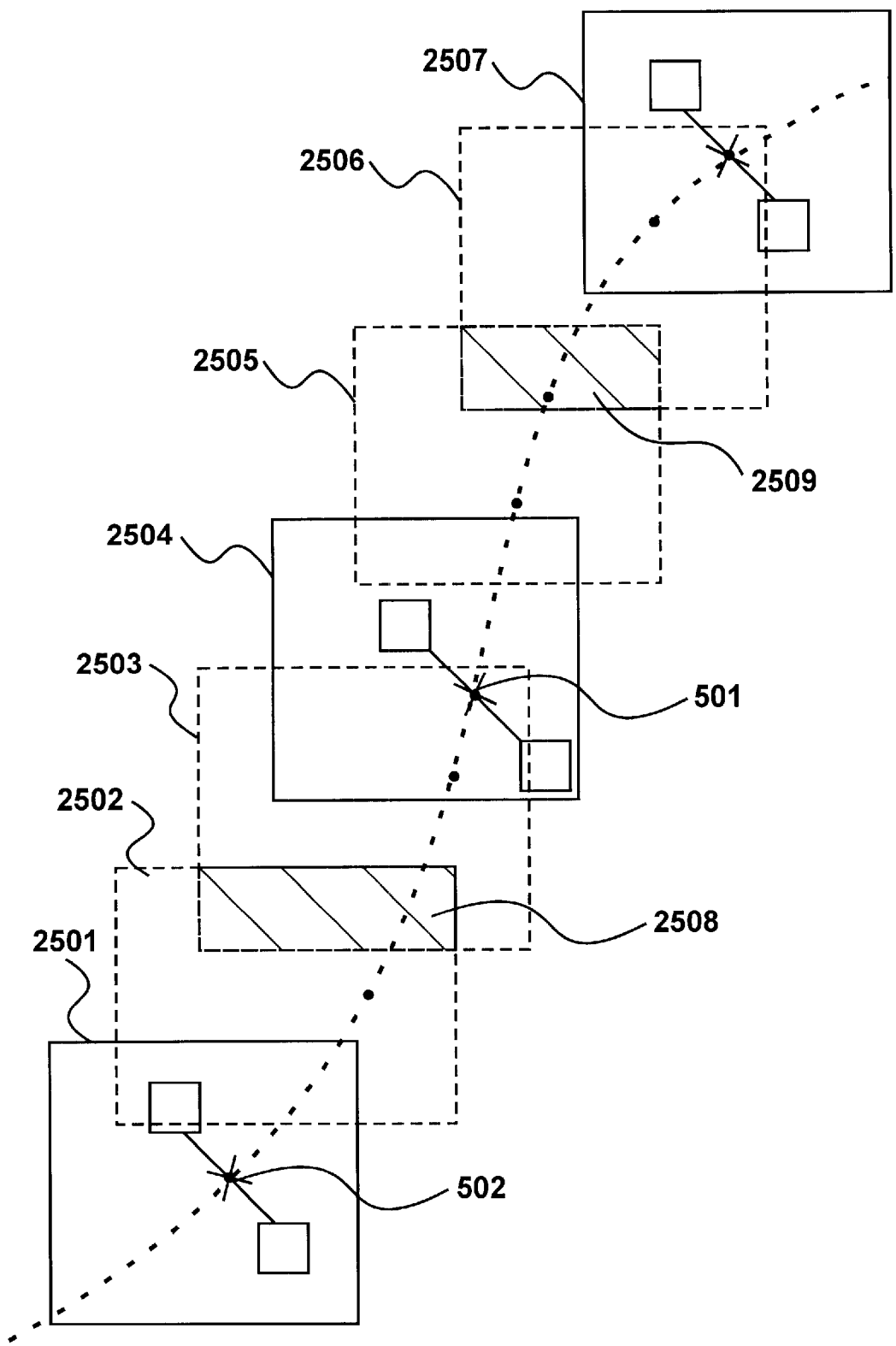
FIG. 25 illustrates the generation of cropping boxes.

The process implemented in FIG. 24 takes a spline of the type shown in FIG. 23, having user defined control points, and generates a collection of crop boxes 2501 to 2507 as shown in FIG. 25. Crop boxes 2501, 2504 and 2507 are generated from user defined control points and each have their own associated transformation matrix. Crop boxes 2502, 2503, 2505 and 2506 are defined by step 2406, due to the distance of a spline component point being greater than twenty pixels from the centre of a previously defined crop box. These crop boxes have matrices associated with them but, as previously stated, the same matrices are used as those calculated for user defined control points. Thus, crop box 2502 will rely upon the matrix associated with crop box 2501, while crop box 2503 will rely on the matrix defined for crop box 2504.

Given a pixel colour defined in colour-space, an associated mask value may be generated from an associated transformation matrix. The procedures described allow many transformation matrices to be determined and a selection is made based on the geometric position of the pixel. In particular, a selection is made based on a determination of the position of a pixel within a particular cropping box.

Thus, pixels falling within cropping box 2501 will undergo a colour transformation as determined by the transformation matrix associated with control point 502. Similarly, pixels falling within cropping box 2504 will undergo a similar colour-space transformation in order to calculate a matte value following the transformation matrix associated with control point 501. Cropping box 2503 is also associated with the matrix of control point 501 therefore no conflict occurs when a pixel falls within cropping box 2503 and cropping box 2504.

A similar situation arises for pixels falling within cropping box 2501 and 2502, given that both of these cropping boxes are associated with the transformation matrix of control point 502. However, a problem does occur for pixels which exist in the overlap of cropping boxes where a matrix transition occurs, such as shaded regions 2508 and 2509. Pixels falling within shaded region 2508 may be associated with cropping box 2502 or with cropping box 2503.

Figure 26:
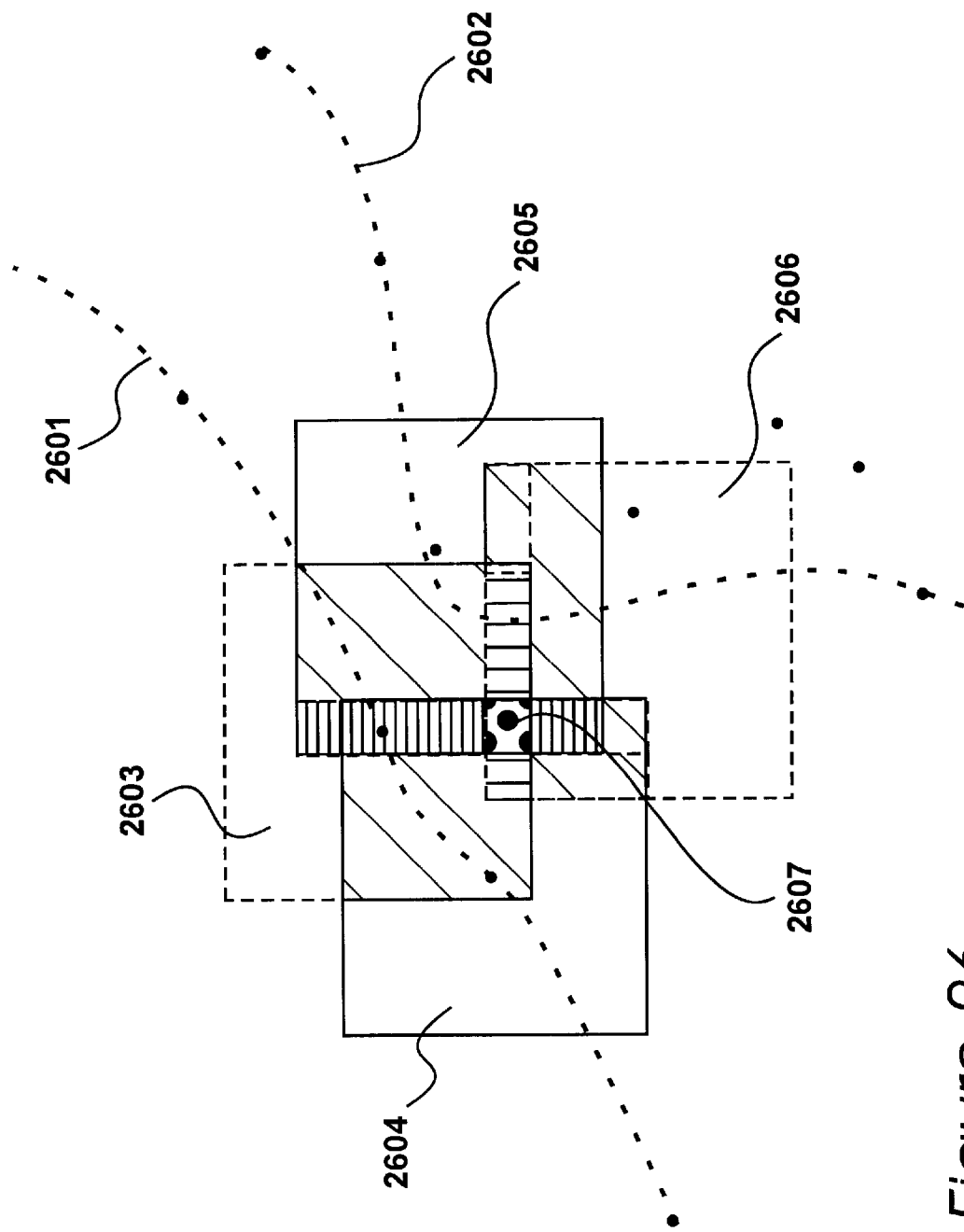
FIG. 26 illustrates a worst case cropping box overlap condition.

A worst case cropping box overlap condition is illustrated in FIG. 26. In FIG. 26 a first spline 2601 approaches a second spline 2602, each having associated cropping boxes and matrices. The process described with respect to FIG. 24 produces cropping boxes 2603, 2604, 2605 and 2606. Furthermore, shaded region 2607 represents the overlap of all four cropping boxes 2603 to 2606. Thus, four colour-space transformation matrices are associated with pixels lying within shaded region 2607.

At step 804 as shown in FIG. 8, the cropping box data is processed so as to populate matrix pointer buffers and matrix weighting buffers. In this way, it is possible to take account of all possibilities in terms of cropping box overlaps, irrespective of whether a complex overlapping situation exists, as shown in FIG. 26, or a very simple overlapping situation exists as with cropping boxes 2501 and 2502. In theory, it would be possible to have even more complex overlaps with more than four cropping boxes overlapping. However, the system is configured such that it is not possible for a user to specify control points which would result in cropping box overlaps to a depth greater than four.

Figure 27:
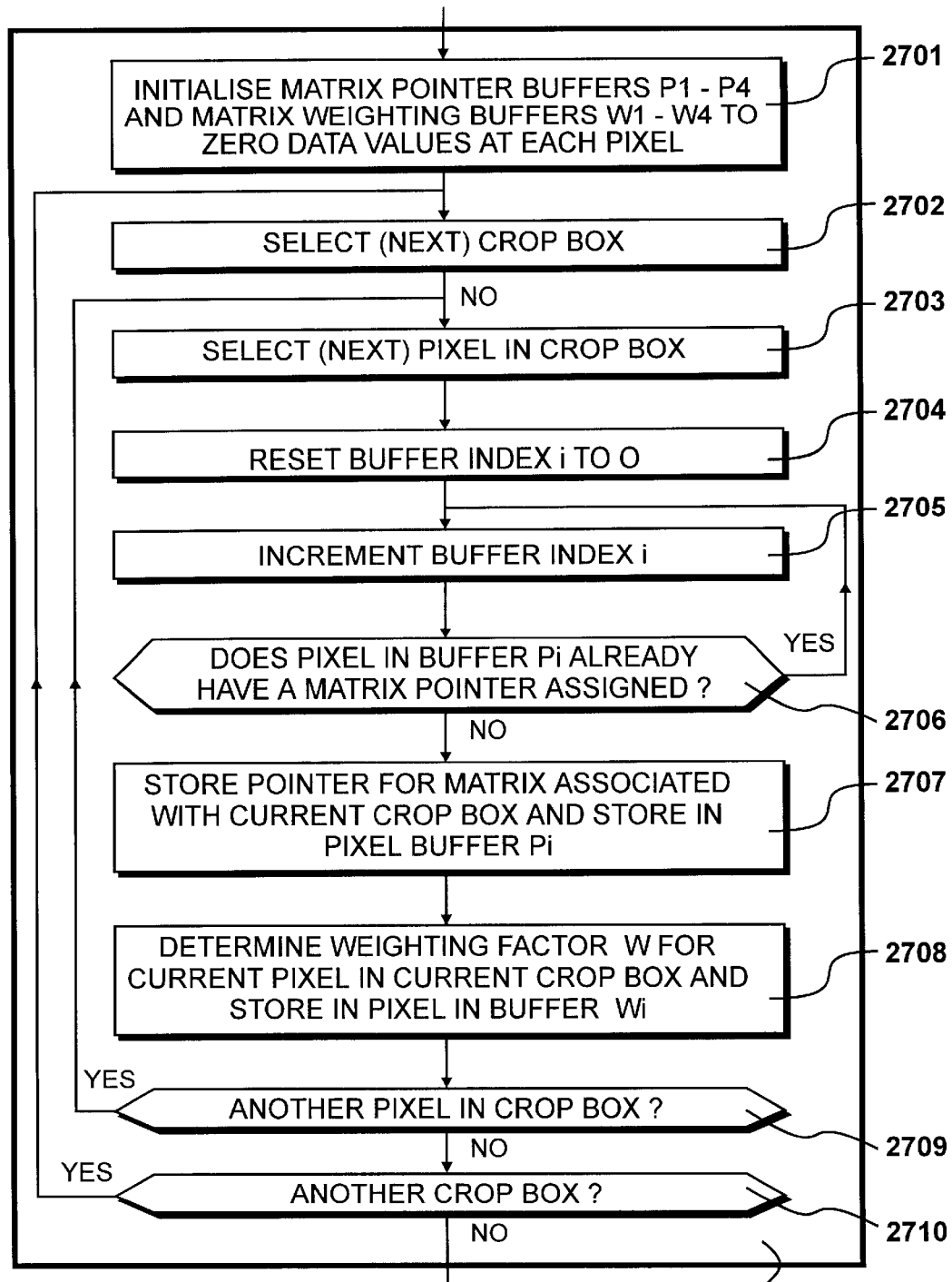
FIG. 27 details the process of populating matrix pointer buffers identified in FIG. 8.

Process 804 is detailed in FIG. 27. At step 2701 matrix pointer buffers 702 and matrix weighting buffers 703 are initialised to zero data values for each pixel.

At step 2702 a crop box is selected and at step 2703 a pixel in the crop box selected at step 2702 is itself selected. At step 2704 a buffer index eye is reset to zero and at step 2705 the buffer index eye is incremented.

At step 2706 a question is asked as to whether the indexed pixel has a matrix pointer assigned. If this question is answered in the affirmative, control is returned to step 2705 and the buffer index is incremented. Alternatively, if the question is asked at step 2706 is answered in the negative, control is directed to step 2707.

At step 2707 a pointer is stored in the pointer buffer identifying the matrix associated with the particular crop box currently being considered.

At step 2708 a weighting factor is determined for the current pixel being considered with respect to the current crop box being considered and this weighting factor is then stored at an appropriate pixel position within the weighting buffer 703.

At step 2709 a question is asked as to whether another pixel is to be considered in the crop box and if answered in the affirmative control is returned to step 2703. After all of the pixels have been considered for a particular crop box, resulting in the question asked at step 2709 being answered in the negative, a question is asked at step 2701 as to whether another crop box is to be considered and when this question is answered in the affirmative control is returned to step 2702. Eventually, all of the crop boxes will be considered resulting in the question asked at step 2701 being answered in the negative.

Figure 28:
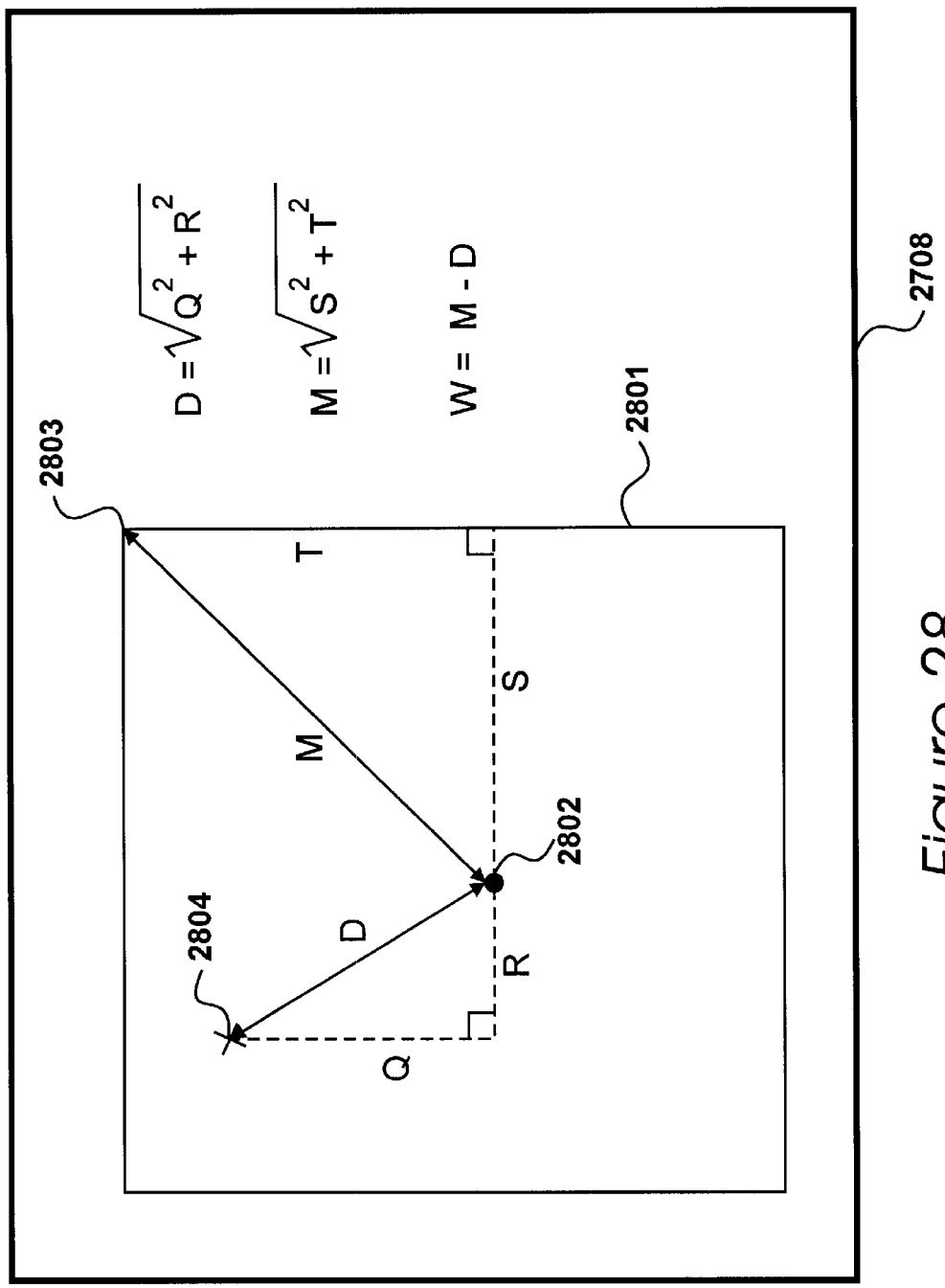
FIG. 28 illustrates procedures for determining weighting factors.

Procedures for determining weighting factors are illustrated in FIG. 28. A cropping box 2801 has a central position 2802. The maximum displacement of a pixel from central position 2802, within cropping box 2801, occurs at the corners of the cropping box, resulting in a maximum displacement from the central location 2802 to a typical corner, such as corner 2803, being represented by a maximum displacement m.

A typical pixel under consideration is shown at 2804 and the displacement of this pixel to the central position 2802 is identified by displacement value d.

A weighting value is calculated for a particular pixel by subtracting the value d from the maximum value m. As illustrated in FIG. 28, d is calculated as the square root of q squared plus r squared and m is calculated as the square of root of s squared plus t squared.

Figure 29:
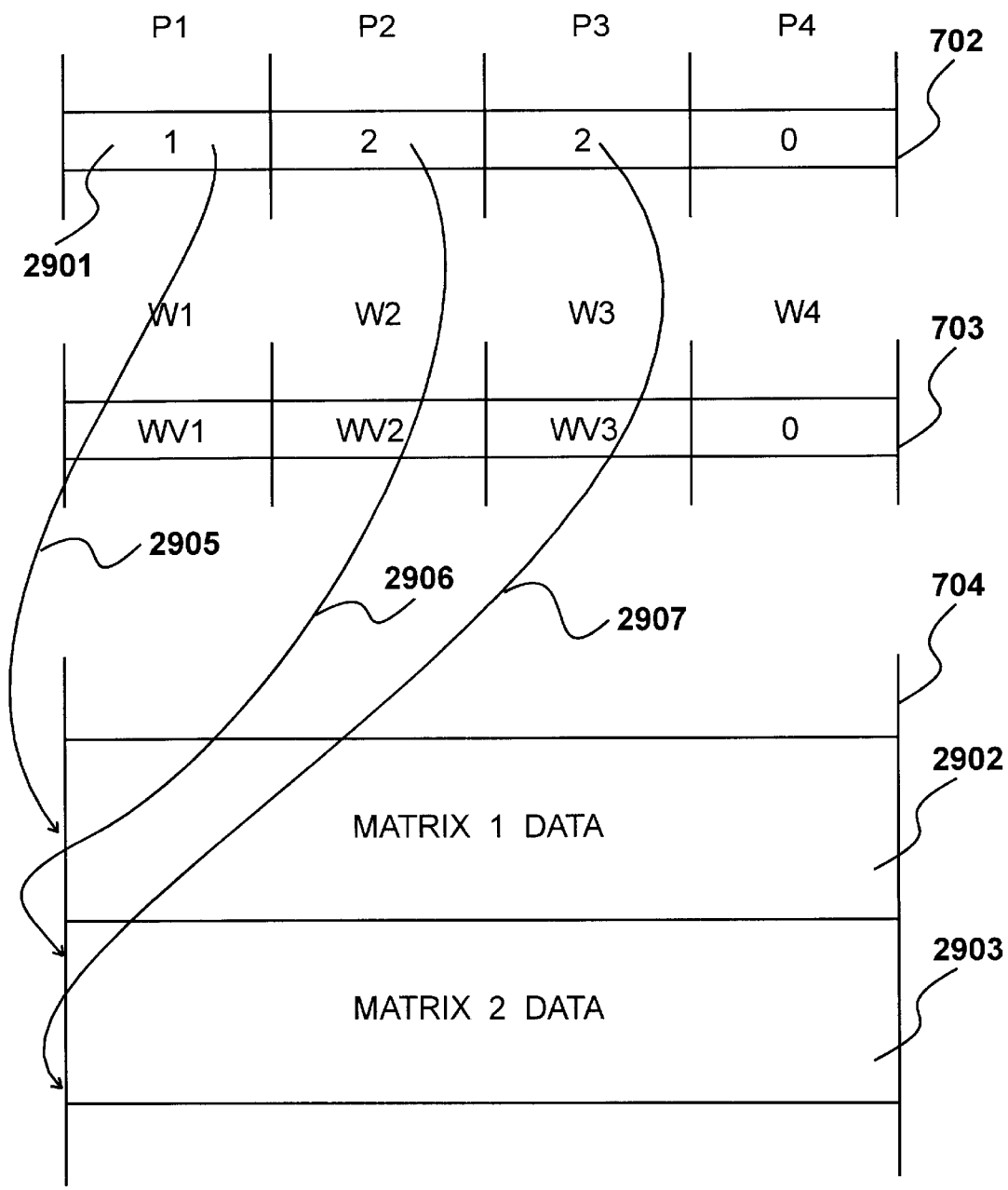
FIG. 29 illustrates the population of matrix pointer buffers and matrix weighting buffers identified in FIG. 7.

The population of matrix pointer buffers and matrix weighting buffers will be described with reference to FIG. 29, in respect of a single pixel position. Each pixel may have a total of four matrix pointers and four matrix weighting values and these four values are written to respective eight bit portions of the same thirty-two bit word in memory areas 702 and 703. A single thirty-two bit word of the matrix pointer buffer 702 is illustrated in FIG. 29 with its associated word of the matrix weighting buffer 703. On initiating the procedure shown in FIG. 27, values stored in buffers 702 and 703 are initialised to zero at step 2701.

The data is processed on a cropping box by cropping box basis therefore individual pixels may be revisited on subsequent iterations of the cropping box loop. Buffer index i is therefore used to identify whether data at position P1, P2, P3 or P4 is to be modified within the thirty-two bit words.

When a pixel is being considered, a question is asked at step 2706 as to whether a matrix pointer has been assigned. If not, and the question is answered in the negative, the matrix pointer is stored at the first location following procedure 2707. Thus, on the first iteration, a matrix pointer is written to location 2901, this being the P1 location for the particular pixel word under consideration. The matrix data itself has been calculated and written to the matrix data area 704. Location of each matrix data is known in memory therefore the matrix pointers are configured to map onto the physical memory addresses as illustrated by arrows 2905, 2906 and 2907. Thus, when the pixel under consideration is being processed for a first time, it has been identified as belonging to a cropping box associated with matrix 1, therefore a pointer to matrix 1 is written to the P1 location 2901.

Subsequently, a second cropping box is processed which again identifies the pixel considered in FIG. 29. On this occasion, the pixel has fallen within a cropping box associated with matrix 2, therefore a pointer to the matrix 2 data is written to pointer buffer P2 for the memory word.

In the example shown, the pixel falls within three cropping boxes therefore it is identified again resulting in an association with matrix data 2 being established at the P3 position. Thus, it can be appreciated that a pixel may be found in up to four cropping boxes, resulting in pointers being established to four matrix data sets.

When a pixel is associated with a matrix, weighting values are calculated, as described with reference to FIG. 28. Thus, in the example shown in FIG. 29, a first weighting value WV1 is calculated for pointer P1, a second weighting value WV2 is calculated for pointer P2 and a third weighting value WV3 is calculated for pointer P3.

Having completed the procedure illustrated in FIG. 27, transformations will have been determined for all pixels which are to constitute the soft edged mask. In some situations, the generation of a transformation is straightforward, given that the pixel will only be associated with a single transformation matrix. However, as previously described, the system is configured so as to take account of pixels falling within a maximum of four cropping boxes.

Figure 30:
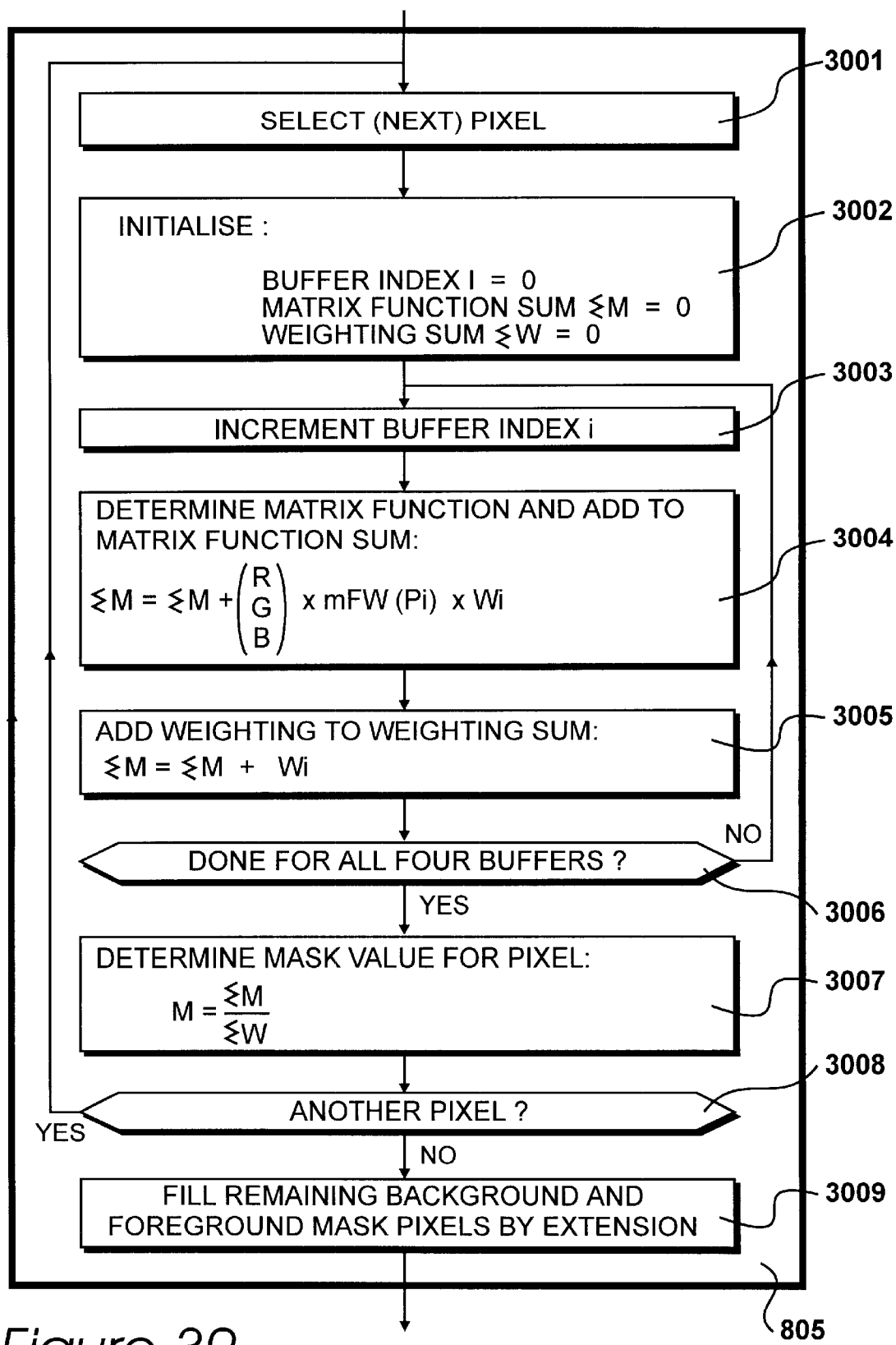
FIG. 30 details the processing of pixel data with matrix pointer buffers and matrix weighting buffers.

Procedures 805 for defining the contents of the mask image buffer, by processing the pixel data with matrix pointer buffers and matrix weighting buffers, is detailed in FIG. 30. At step 3001 a pixel is selected and at step 3002 a buffer index, matrix sum and weighting sum are initialised to zero.

At step 3003, a loop is entered and the buffer index, initialised at step 3002 is incremented. At step 3004 a matrix function is determined and this matrix function is added to the matrix sum. Thus, this procedure is repeated for each matrix identified in the matrix pointer buffer for the pixel under consideration.

At step 3005 the weighting value is identified and this weighting value is added to the weighting sum.

At step 3006 a question is asked as to whether all four buffers have been considered and when answered in the negative control is returned to step 3003 where the buffer index value is incremented.

After all four buffers have been considered, four matrix functions will have been calculated and the resulting values added to the matrix sum by repeated application of step 3004. Similarly, all of the weighting values will have been considered and these weighting values will have been added together by repeated application of step 3005.

At step 3007 the actual mask value of the pixel is determined by dividing the matrix functional sum calculated by step 3004 by the weighting sum calculated by step 3005.

At step 3008 a question is asked as to whether another pixel is to be processed and when answered in the affirmative control is returned to step 3001.

Eventually, the question asked at step 3008 will be answered in the negative whereafter remaining background and foreground pixels are populated at step 3009.

Procedures performed by the process shown in FIG. 30 are illustrated in FIG. 31, representing the division performed at step 3007. Thus, the top line of the equation shown in FIG. 31 represents the summing of the matrix functions with the bottom line representing the summing of the weighting values.

Figure 32:
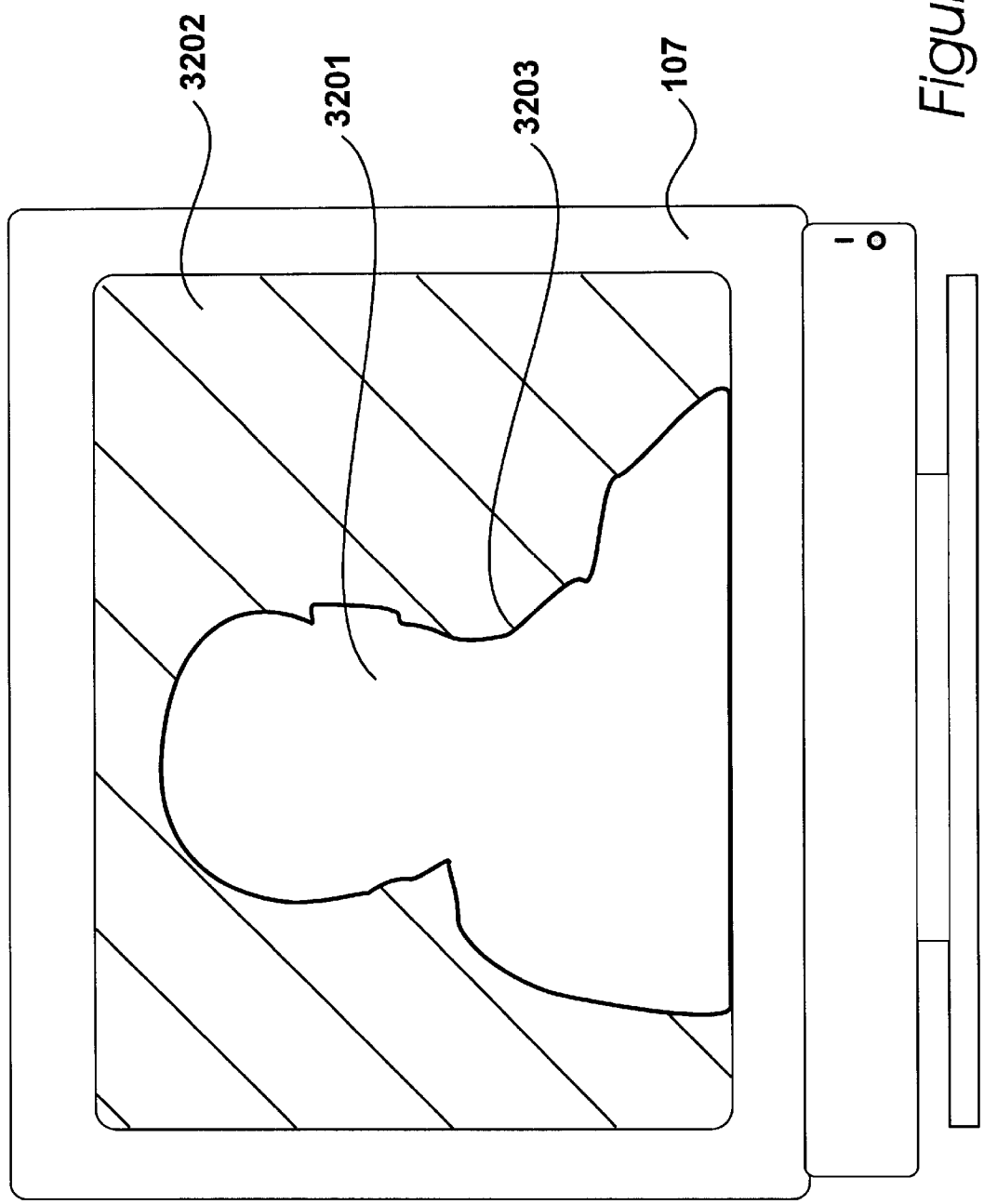
FIG. 32 illustrates the filling of remaining background and foreground pixel values.

The application of step 3009, in order to fill the remaining background and foreground mask pixels, is illustrated in FIG. 32. The process will have calculated soft values for the soft edged mask in which values on the internal side of the soft edged mask are set to zero with values towards the external side of the soft edged mask being set to 255. The remaining areas, which often represent the majority of the image, are then set to hard zero or 255 values by performing a fill. Thus, the mask now includes foreground values 3201 and background values 3202 with a smooth edge transition 3203. In this way, it is possible to produce masks which resemble masks generated by chroma-keying procedures, in which foreground images are recorded against blue screens for example, from images which have not been recorded in this way and as such present an extremely unfriendly environment for any key matting or masking operation.

What we claim is:

1. A method of processing image data in which an image frame is defined by a plurality of pixel values, comprising steps of viewing an image frame in which a perceived object is to be distinguished from the remainder of the image frame;

manually identifying control positions in proximity to the boundary of said object;

comparing pixel values around each of said identified positions to define local colour transitions; and interpolating between said transitions to produce a boundary for said object.

2. A method according to claim 1, wherein a first region is identified at a position on a first side of said boundary;
   a second region is selected at a position on the second side of said boundary; and
   the colours of said selected regions are compared to define control values for said boundary.

3. A method according to claim 2, wherein the position of said first region and the position of said second region are identified by shapes connected together by a line crossing said boundary.

4. A method according to claim 3, wherein in the length of said line is adjustable.

5. A method according to claim 1, wherein pixels at said first position are analysed as a region in colour-space;
   pixels at said second region are analysed as a region in colour-space; and
   control values are generated in response to said analyses.

6. A method according to claim 5, wherein a bounding three-dimensional object is placed around said colour-space regions.

7. A method according to claim 6, wherein said bounding objects are cuboids.

8. A method according to claim 7, wherein control values are interpolated in an intermediate region between said cuboids.

9. A method according to claim 8, wherein said intermediate region is defined by a first plane intersecting a vertex of one of said cuboids and a second plane intersecting a plane of the other of said cuboids.

10. A method according to claim 8, wherein said boundary is defined by a plurality of substantially overlapping intermediate regions of control values.

11. A method according to claim 10, wherein intermediate regions are repeated to create a continuous boundary of control values.

12. Image processing apparatus, comprising
   storage means for storing image frames as a plurality of pixel values;
   viewing means for viewing an image frame in which a perceived object is to be distinguished from the remainder of the image frame;
   input means configured to receive input signals identifying control points close to the boundary of said object;
   comparing means configured to compare pixel values around each identified control point to define local colour transition points; and
   interpolating means configured to interpolate between said defined transition points to produce a boundary for said object.

13. Apparatus according to claim 12, wherein said input means is used to identify a first region on a first side of said boundary;
   said input means is used to define a second region on the second side of said boundary; and
   said comparing means is configured to define control values for said boundary.

14. Apparatus according to claim 11, including processing means configured to analyse pixels at said first position as a region in colour-space, analyse said second region as a region in colour-space and generate control values in response to said analyses.

15. Apparatus according to claim 14, wherein said processing means is configured to place a three-dimensional object around said colour-space regions.

16. Apparatus according to claim 15, wherein said processing means is configured to place a cuboid bounding object around said colour-space regions.

17. Apparatus according to claim 16, wherein said interpolating means is configured to interpolate control values for an intermediate region between said cuboids.

18. Apparatus according to claim 17, wherein said processing means is configured to define said intermediate region in terms of a first plane intersecting a vertex of one of said cuboids and a second plane intersecting a plane of the other of said cuboids.

19. Apparatus according to claim 17, wherein said interpolating means is configured to define a plurality of substantially overlapping intermediate regions of control values to produce a boundary for said object.

20. Apparatus according to claim 19, wherein said interpolating means is configured to repeat said intermediate regions to create a continuous boundary of control values.

21. A computer system programmed to process image data in which an image frame is defined by a plurality of pixel values, the computer system being programmed to:
   view an image frame in which a perceived object is to be distinguished from the remainder of the image frame;
   record control positions in response to manual operation of an interface device, wherein said control positions are located in proximity to the boundary of said object;
   compare pixel values around each of said identified positions to define local colour transitions; and
   interpolate between said transitions to produce a local portion of a boundary for said object.

22. A computer system programmed according to claim 21, further programmed to define control values for a boundary by comparing colours of said selected regions, wherein a first region is identified at a position on a first side of said boundary and a second region is selected at a position on the second side of said boundary.

23. A computer system programmed according to claim 22, further programmed to define shapes so as to identify the position of said second region, wherein said shapes are connected together by a line crossing said boundary.

24. A computer system programmed according to claim 23, further programmed to facilitate adjustment to the length of said line.

25. A computer system programmed according to claim 21, further programmed to analyse pixels at said first position as a region in colour-space, analyse pixels at said second region as a region in colour-space, and generate control values in response to said analyses.

26. A computer system programmed according to claim 25, further programmed to place a three-dimensional object around said colour-space regions.

27. A computer system programmed according to claim 26, further programmed to place a bounding cuboid around said colour-space regions.

28. A computer system programmed according to claim 27, further programmed to interpolate control values in intermediate regions between said cuboids.

29. A computer system programmed according to claim 28, further programmed to define said intermediate region by a first plane intersecting a vertex of one of said cuboids and a second plane intersecting a plane of the other of said cuboids.

30. A computer system programmed according to claim 28, further programmed to define said boundary by a plurality of substantially overlapping intermediate regions of control values.

31. A computer system programmed according to claim 30, further programmed to repeat the creation of intermediate regions so as to create a continuous boundary of control values.

32. A computer-readable medium having computer-readable instructions executable by a computer, such that said computer performs the steps of:

storing image frames with a plurality of pixel values in storage means;

reading an image frame and supplying said image frame to display means so as to allow an image frame to be viewed so that a perceived object may be distinguished from the remainder of the image frame;

receiving input signals identifying control points close to the boundary of said object via input means;

comparing pixel values around each identified control point to define local colour transition points; and interpolating between said defined transition points to produce a boundary for said object.

33. A computer-readable medium according to claim 32, having computer-readable instructions executable by a computer, such that said computer performs the further steps of:

comparing control values specified for an input value identified on a first side of said boundary with an input value defined in a region on the second side of said boundary.

34. A computer-readable medium according to claim 31, having computer-readable instructions executable by a computer, such that said computer performs the further steps of:

analysing pixels at said first position as a region in colour-space, analysing said second region as a region in colour-space and generating control values in response to said analyses.

35. A computer-readable medium according to claim 34, having computer readable instructions executable by a computer, such that said computer performs the further step of placing a three-dimensional object around said colour-space regions.

36. A computer-readable medium according to claim 35, having computer-readable instructions executable by a computer, such that said computer performs the further step of placing a bounding cuboid around said colour-space regions.

37. A computer-readable medium according to claim 1, having computer-readable instructions executable by a computer, such that said computer performs the further step of interpolating control values for an intermediate region between said cuboids.

38. A computer-readable medium according to claim 37, having computer-readable instruction executable by a computer, such that said computer performs the further steps of:

defining said intermediate region in terms of a first plane intersecting a vertex of one of said cuboids; and a second plane intersecting a plane of the other of said cuboids.

39. A computer-readable medium according to claim 27, having computer-readable instructions executable by a computer, such that said computer performs a further step of defining a plurality of substantially overlapping intermediate regions of control values, to produce a boundary for said object.

40. A computer-readable medium according to claim 39, having computer-readable instructions executable by a computer, such that said computer performs the further step of repeating said intermediate regions to create a continuous boundary of control values.

* * * * *

UNITED STATES PATENT AND TRADEMARK OFFICE
CERTIFICATE OF CORRECTION

PATENT NO.    : 6,429,875 B1
DATED         : August 6, 2002
INVENTOR(S)   : Daniel Pettigrew and Patrick Arbez It is certified that error appears in the above-identified patent and that said Letters Patent is hereby corrected as shown below:

<u>Column 15,</u>
Line 11, after "wherein" strike "in"

Signed and Sealed this

Tenth Day of June, 2003

JAMES E. ROGAN
*Director of the United States Patent and Trademark Office*